United States Patent
Xiong et al.

(10) Patent No.: US 11,204,681 B2
(45) Date of Patent: Dec. 21, 2021

(54) PROGRAM ORCHESTRATION METHOD AND ELECTRONIC DEVICE

(71) Applicant: Huawei Technologies Co., Ltd., Shenzhen (CN)

(72) Inventors: Yuanfeng Xiong, Shanghai (CN); Yuanqiang Ni, Shanghai (CN); Lin Yang, Wuhan (CN); Zhishan Zhuang, Shanghai (CN); Xiaoyun Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/958,976

(22) PCT Filed: Dec. 29, 2017

(86) PCT No.: PCT/CN2017/120053
§ 371 (c)(1),
(2) Date: Jun. 29, 2020

(87) PCT Pub. No.: WO2019/127444
PCT Pub. Date: Jul. 4, 2019

(65) Prior Publication Data
US 2020/0341617 A1 Oct. 29, 2020

(51) Int. Cl.
*G06F 3/0481* (2013.01)
*G06F 9/445* (2018.01)
(Continued)

(52) U.S. Cl.
CPC ............ *G06F 3/04817* (2013.01); *G06F 9/44* (2013.01); *G06F 9/44505* (2013.01); *G06F 9/451* (2018.02)

(58) Field of Classification Search
None
See application file for complete search history.

(56) References Cited

U.S. PATENT DOCUMENTS

| 5,850,548 A | 12/1998 | Williams | |
|---|---|---|---|
| 2010/0023874 A1* | 1/2010 | Frohwein | G06F 3/048 715/747 |

(Continued)

FOREIGN PATENT DOCUMENTS

| CN | 1761943 A | 4/2006 |
|---|---|---|
| CN | 102567352 A | 7/2012 |
| CN | 102681841 A | 9/2012 |

(Continued)

OTHER PUBLICATIONS

Weibo, "API文档/en," Nov. 23, 2016, https://web.archive.org/web/20161123172412/http://open.weibo.com/wiki/API%E6%96%87%E6%A1%A3/en.*

(Continued)

*Primary Examiner* — Ryan Barrett
(74) *Attorney, Agent, or Firm* — Conley Rose, P.C.

(57) ABSTRACT

A program orchestration method includes displaying at least one atomic service icon on a touchscreen of an electronic device, where the atomic service provides a service capability in an API manner. The method further includes displaying an orchestration area, where the orchestration area is used for accommodating atomic service icons. The method further includes detecting a first touch event for a first atomic service icon, displaying the first atomic service icon in the orchestration area, detecting a second touch event for a second atomic service icon, displaying the second atomic service icon in the orchestration area, detecting a third touch event, and orchestrating the first atomic service icon and the second atomic service icon that are in the orchestration area, to generate a first program.

17 Claims, 31 Drawing Sheets

(51) Int. Cl.
    *G06F 9/451*           (2018.01)
    *G06F 9/44*            (2018.01)

(56) References Cited

U.S. PATENT DOCUMENTS

| | | | |
|---|---|---|---|
| 2010/0269069 A1* | 10/2010 | Paila | G06F 3/0482 |
| | | | 715/835 |
| 2011/0067025 A1* | 3/2011 | Cragun | G06F 9/45512 |
| | | | 718/100 |
| 2011/0093816 A1* | 4/2011 | Chang | G06F 3/0488 |
| | | | 715/835 |
| 2011/0191516 A1 | 8/2011 | Xiong et al. | |
| 2013/0091557 A1 | 4/2013 | Gurrapu | |
| 2015/0017964 A1 | 1/2015 | Cha | |
| 2017/0147308 A1* | 5/2017 | Wang | G06F 8/38 |

FOREIGN PATENT DOCUMENTS

| | | |
|---|---|---|
| CN | 103942207 A | 7/2014 |
| CN | 105247511 A | 1/2016 |
| CN | 105512304 A | 4/2016 |
| CN | 106201506 A | 12/2016 |

OTHER PUBLICATIONS

Weibo, "Statuses/public timeline/en," Oct. 25, 2016, https://web.archive.org/web/20161025041845/http://open.weibo.com/wiki/Statuses/public_timeline/en.*

Weibo, "Statuses/upload/en," Oct. 25, 2016, https://web.archive.org/web/20161025042841/http://open.weibo.com/wiki/Statuses/upload/en.*

* cited by examiner

PROGRAM ORCHESTRATION METHOD AND ELECTRONIC DEVICE

CROSS-REFERENCE TO RELATED APPLICATIONS

This application is a national stage of International Application No. PCT/CN2017/120053, filed on Dec. 29, 2017, which is hereby incorporated by reference in its entirety.

TECHNICAL FIELD

This application relates to the wireless communications field, and in particular, to a program orchestration method and an electronic device.

BACKGROUND

With rapid development of the mobile internet, people increasingly rely on an electronic device (for example, a mobile phone or a tablet computer) to process daily transaction, for example, air ticket booking, schedule arrangement, and social contact. Therefore, more and more application programs (which may be referred to as App below) are installed on the electronic device. In the prior art, these application programs with a single function require a professional program developer to orchestrate the programs by using professional programming software and release orchestrated apps to an app market. In addition, each app has a single function. When processing complex daily transaction on an electronic device, a user usually needs to switch back and forth among a plurality of apps. Therefore, how to simply and efficiently orchestrate a program having a plurality of functions becomes an urgent technical problem that needs to be resolved nowadays.

SUMMARY

To resolve the foregoing technical problem, this application provides a program orchestration method and an electronic device, to easily, user-friendly, and efficiently orchestrate a program having a plurality of functions. In this way, transaction processing efficiency of the electronic device is improved, and user experience of program orchestration is also improved.

According to a first aspect, this application provides a program orchestration method. The method may be implemented on an electronic device having a touchscreen. The method may specifically include: displaying at least one atomic service icon on the touchscreen, where the atomic service icon corresponds to one atomic service, and the atomic service provides a service capability in an API manner; displaying an orchestration area on the touchscreen, where the orchestration area is used for accommodating atomic service icons selected by a user; detecting, by the electronic device, a first touch event (for example, which may be a drag gesture) of the user for a first atomic service icon, where the first atomic service icon corresponds to a first atomic service; and in response to the first touch event, displaying, by the electronic device, the first atomic service icon in the orchestration area; detecting, by the electronic device, a second touch event (for example, which may be a drag gesture) of the user for a second atomic service icon, where the second atomic service icon corresponds to a second atomic service; and in response to the second touch event, displaying, by the electronic device, the second atomic service icon in the orchestration area; detecting, by the electronic device, a third touch event of the user; and in response to the third touch event (for example, which may be a tap operation), orchestrating, by the electronic device, the first atomic service icon and the second atomic service icon that are in the orchestration area, to generate a first program, where the first atomic service is a system service of the electronic device, and the second atomic service is a network service. The foregoing technical solution greatly reduces complexity of program orchestration, and the user can complete, by using a simple touch gesture, orchestration of a program having a plurality of functions.

In a possible implementation, the method may further include: detecting, by the electronic device, an input of the user; in response to the input, sending, by the electronic device, release request information to a server in the wireless network, where the release request information includes an identifier of the first program obtained through orchestration and an identifier of the electronic device; and receiving, by the electronic device, response information sent by the server, where the response information indicates that the first program is successfully released on a service open platform on the server. Releasing a program obtained through orchestration to the server in the wireless network allows more users to download the program, thereby facilitating use of the user.

In another possible implementation, the first atomic service provides a service capability by using a local API of the electronic device, and the second atomic service provides a service capability by using an API of a network. For example, the first atomic service may be detecting a pick-up gesture, and the electronic device may detect the gesture by invoking a system interface. The second atomic service may be sharing to WEIBO, and the electronic device may invoke a network interface related to WEIBO.

In another possible implementation, the first touch event is a gesture of dragging the first atomic service icon, and the second touch event is a gesture of dragging the second atomic service icon. In this way, the user can more efficiently orchestrate the program by using a simple drag gesture.

In another possible implementation, the orchestrating, by the electronic device, the first atomic service icon and the second atomic service icon, to generate a first program specifically includes: orchestrating, by the electronic device based on a program orchestration model, the first atomic service corresponding to the first atomic service icon and the second atomic service corresponding to the second atomic service icon; and generating the first program.

In another possible implementation, the system service interface is an interface used for obtaining a new photo, and the network service interface is an interface used for obtaining a WEIBO service.

According to a second aspect, this application provides an electronic device, including a touchscreen, where the touchscreen includes a touch-sensitive surface and a display, one or more processors, a memory, a plurality of application programs, and one or more computer programs, where the one or more computer programs are stored in the memory, the one or more computer programs include an instruction, and when the instruction is executed by the electronic device, the electronic device is enabled to perform the foregoing program orchestration method.

According to a third aspect, this application provides a method for activating an orchestrated program. The method may be implemented on an electronic device having a touchscreen. The method may specifically include: receiving, by the electronic device, a first input event (for example, a tap operation); and in response to the first input event, displaying a home screen of a first application program on the touchscreen of the electronic device, where the home screen includes a program card corresponding to the orchestrated program, and the program card includes basic information of the orchestrated program and includes a control configured to download the orchestrated program; receiving, by the electronic device, a second input event for the control; in response to the second input event, downloading, by the electronic device, the orchestrated program from a wireless network, where the orchestrated program includes code for invoking a system service interface of the electronic device and code for invoking a network service interface in the wireless network, the orchestrated program is displayed on the touchscreen in a card form, and the basic information of the orchestrated program includes a name and a function brief introduction of the orchestrated program; and displaying, by the electronic device, a downloaded program card on the touchscreen; and receiving, by the electronic device, a third input event for the program card; and in response to the third input event, activating, by the electronic device, the orchestrated program corresponding to the program card, where the activated orchestrated program is resident in the background of the electronic device.

In a possible implementation, the foregoing method may further include: when the orchestrated program detects a trigger event by using the system service interface, the orchestrated program is automatically run in the background of the electronic device.

In another possible implementation, the trigger event includes the following: the electronic device stores a new photo, or the electronic device enables a Do Not Disturb mode, or the electronic device detects a pick-up gesture.

In another possible implementation, that the orchestrated program is automatically run in the background of the electronic device specifically includes: sending, by the orchestrated program by invoking the network service interface, data related to running to the wireless network.

In another possible implementation, the system service interface is an interface used for obtaining a new photo, and the network service interface is an interface used for obtaining a WEIBO service.

According to a fourth aspect, this application provides an electronic device, including a touchscreen, where the touchscreen includes a touch-sensitive surface and a display, one or more processors, a memory, a plurality of application programs, and one or more computer programs, where the one or more computer programs are stored in the memory, the one or more computer programs include an instruction, and when the instruction is executed by the electronic device, the electronic device is enabled to perform the foregoing method for activating an orchestrated program.

According to a fifth aspect, an embodiment of the present invention further provides a program orchestration apparatus. The apparatus has a function of implementing behavior of the electronic device in the foregoing method. The function may be implemented by hardware, or may be implemented by hardware executing corresponding software. The hardware or the software includes one or more modules corresponding to the foregoing function.

According to a sixth aspect, this application further provides a computer readable storage medium, where the computer readable storage medium stores an instruction, and when the instruction is run on a computer, the computer is enabled to perform the methods in the foregoing aspects.

According to a seventh aspect, this application further provides a computer program product including an instruction. When the computer program product is run on a computer, the computer is enabled to perform the methods according to the foregoing aspects.

These aspects and other aspects of this application are clear and easy to understand in descriptions of the following embodiments.

It should be understood that descriptions of technical features, technical solutions, beneficial effects, or similar words in this application do not imply that all features and advantages may be implemented in any single embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may be further identified in a specific embodiment that does not reflect all the embodiments.

DESCRIPTION OF EMBODIMENTS

Terms in embodiments of this application are used only for describing specific embodiments, but are not intended to limit this application. The terms "one", "a" and "this" of singular forms used in this specification and the appended claims of this application are also intended to include plural forms, unless otherwise specified in the context clearly. It should be further understood that, the term "and/or" used in the embodiments of this application indicates and includes any or all possible combinations of one or more associated listed items.

Before describing specific embodiments of this application, the following first describes terms and their meanings that may be mentioned in the following embodiments of this application. It may be understood that, unless otherwise specified, the terms and their meanings in all the embodiments of this application may be the same.

In the following embodiments of this application, a task flow (Taskflow) is an executable orchestrated program obtained through orchestration by a user. Specifically, the task flow is to splice a plurality of executable code segments (in other words, atomic services) according to a specified rule and a specified grammar, to generate a new executable script program. The script program can be modified by using a text editor, and is generally used for explaining running of the program. Common script languages include JAVA script, Python, Visual Basic script, WEB programming script, and the like. In the embodiments of this application, the task flow may be considered as an executable program, but is different from an application program (for example, Facebook or Twitter) installed on a mobile phone in the prior art. The application program in the prior art is generally an executable program compiled by a professional developer by using a dedicated programming language and a dedicated programming tool. In the embodiments of this application, the task flow is an executable script program generated by a user (including a common user or a professional developer) by performing an orchestration/splicing operation on various atomic services in a user interface by using the user interface on an electronic device 100. The orchestration or splicing operation is generally implemented by the user by using a gesture of a finger such as tapping or dragging on the electronic device 100. Specific implementation of the orchestration/splicing operation on the task flow is described in detail in the following embodiments.

Figure 1:
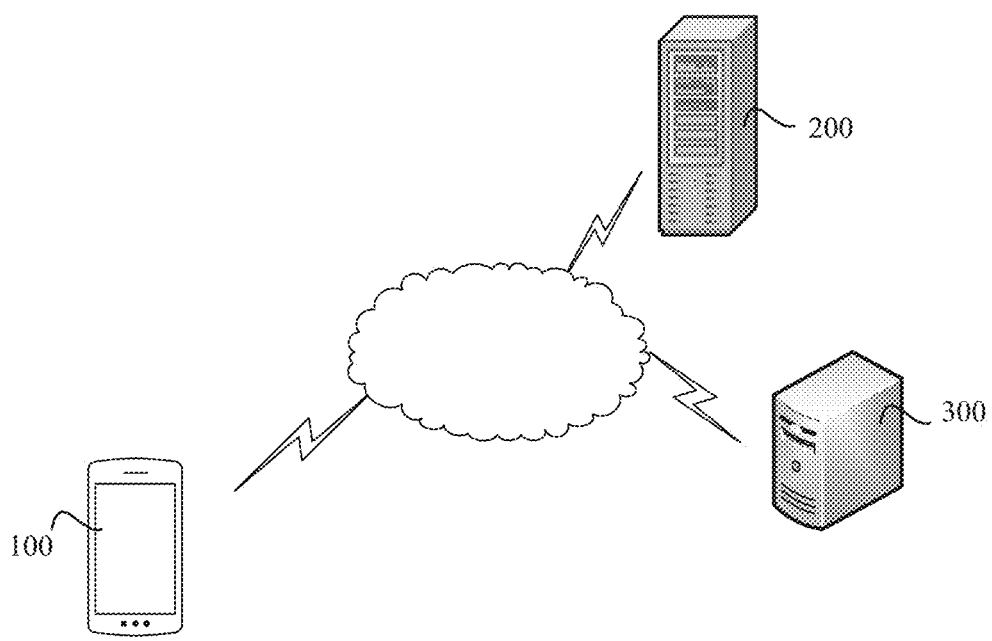
FIG. 1 is a schematic architectural diagram of a network system according to some embodiments.
Figure 3:
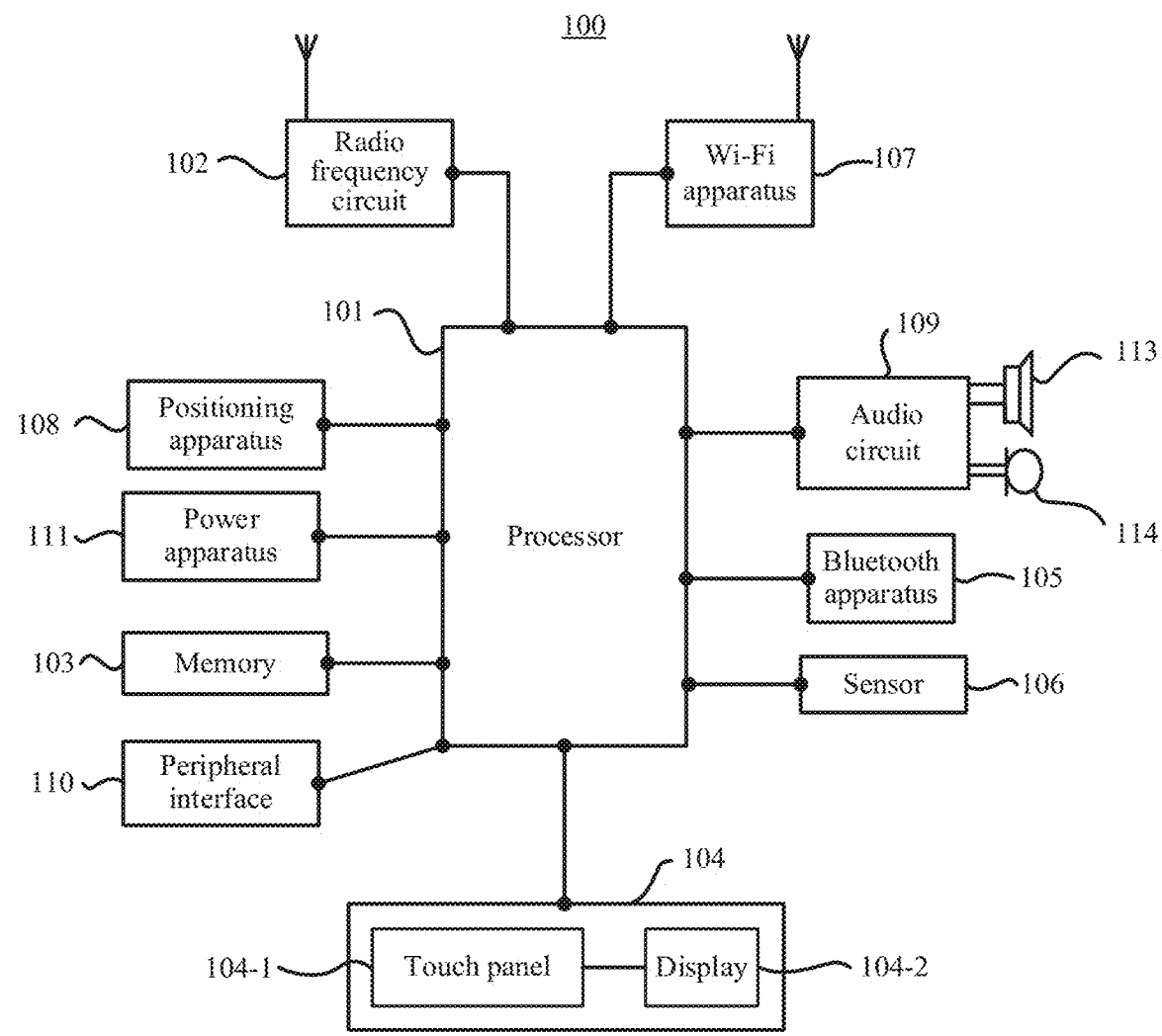
FIG. 3 is a schematic structural diagram of an electronic device according to some embodiments.

The task flow may be obtained through orchestration by the user on an electronic device 100 shown in FIG. 1 or FIG. 3. An atomic service (atomic service) refers to decomposing an executable program into a plurality of executable code segments with a single function, and is finally represented as a single function of a service interface. Each atomic service has a corresponding application programming interface (application programming interface, API), to facilitate use of a task flow developer. Each atomic service has a unique service ID used for identifying the atomic service. The atomic service may be specifically, for example, starting taking a photo, starting recording a video, scanning a two-dimensional code, or sharing to Twitter. It may be understood that the task flow developer may create a new atomic service according to a specific rule, and may upload the created atomic service to a task flow server for registration. In this way, the atomic service after registration is managed by the task flow server and can be used by another developer. In some embodiments of this application, an API form corresponding to the atomic service may comply with RESTful API specifications.

The atomic service may be considered as a segment of executable code. Therefore, information included in the atomic service may include an ID of the atomic service, a type of the atomic service, a uniform resource identifier (uniform resource identifier, URI) of the atomic service, an input function, an output function, a composer, and UI component resources (including an icon, a shape, a color, a parameter, and the like) used for program orchestration. An API of the atomic service is uniformly encapsulated into a URI for invoking, and another service can use the atomic service by invoking a URI corresponding to the atomic service.

Generally, a simple task flow may include two phases: trigger (Trigger) and action (Action). The trigger phase is mainly responsible for triggering an atomic service by using a listening event. The trigger phase is a sufficient condition for executing an action in the task flow, and is generally provided by one atomic service. For example, the atomic service may be entering a specified geo-fence, starting taking a photo, storing a new photo, a pick-up gesture, or the like. In some other embodiments of this application, there may be a plurality of atomic services in a trigger phase of one task flow. In this case, one atomic service is generated earlier than other atomic services in a time sequence, and the other atomic services can be converted into a condition input. An action phase refers to a single-port service that completes a last action in the task flow, and is used for completing final processing. This phase is also provided by an atomic service. For example, the atomic service may be sharing to Twitter, sending an email, or the like.

It can be learned from the foregoing that the atomic service can be classified into two types: a trigger-type atomic service used in the trigger phase and an action-type atomic service used in the action phase. For example, the trigger-type atomic service may be storing a new photo, and the action-type atomic service may be sharing to Twitter. It may be understood that one type of atomic service may be the trigger-type atomic service (in other words, a service that may be provided in the trigger phase), or may be the action-type atomic service (in other words, a service that may be provided in the action phase). For example, an atomic service "enabling an airplane mode" may be orchestrated in the trigger phase or may be orchestrated in the action phase. For example, Table 1 shows basic information of various atomic services in the following. The basic information of the atomic service may include an atomic service name, a service description, a service type, required permission, and the like. The service description is a brief description of a specific meaning and function of the atomic service, the service type indicates whether the atomic service is a trigger-type atomic service or an action-type atomic service, and the required permission is permission that needs to be invoked to run the atomic service.

TABLE 1

| Atomic service name | Service description | Service type | Required permission |
| --- | --- | --- | --- |
| Storing a new photo | A new photo is stored in an album or a gallery | Trigger-type | Album/Gallery |
| Verifying a fingerprint | Validity verification is performed on a collected fingerprint | Trigger-type/ Action-type | System service |

TABLE 1-continued

| Atomic service name | Service description | Service type | Required permission |
|---|---|---|---|
| Locking a screen | A home screen (home screen) is locked | Trigger-type/ Action-type | System service |
| Enabling an airplane mode | After an airplane mode switch is turned on, an electronic device enters the airplane mode | Trigger-type/ Action-type | System service |
| Enabling a Do Not Disturb mode | After a Do Not Disturb mode switch is turned on, an electronic device enters the Do Not Disturb mode | Trigger-type/ Action-type | System service |
| Enabling a location service | After the location service is enabled, a positioning apparatus receives location data, and provides positioning information for an electronic device | Trigger-type/ Action-type | Location service |
| Missed call | There is a missed call in a call log | Trigger-type | Address book and call log |
| Starting charging | An electronic device detects that charging starts | Trigger-type | System service |
| Enabling a driving mode | After a driving mode switch is turned on, an electronic device enters the driving mode | Trigger-type/ Action-type | System service |
| Pick-up gesture | An electronic device is picked up; and a related sensor detects the pick-up gesture | Trigger-type | System service |
| Put-down gesture | An electronic device is put down; and a related sensor detects the put-down gesture | Trigger-type | System service |
| Sending an email | An electronic device sends an edited email/a predefined-format email to a specific email contact | Action-type | System service |
| Search | An electronic device uses a preset search engine to perform searching in a local network or the internet | Trigger-type/ Action-type | System service |
| Disabling a location service | After the location service is disabled, a positioning apparatus stops receiving location data | Trigger-type/ Action-type | Location service |
| Sending to a Facebook contact | An electronic device sends an edited Facebook message/a predefined-format Facebook message to a specific contact | Trigger-type/ Action-type | Log in to a Facebook account |
| Power off | A power button of an electronic device is pressed | Trigger-type/ Action-type | System service |
| Sending an SMS message to a contact | An electronic device sends an edited SMS message and a predefined-format SMS message to a specific contact in an address book | Trigger-type/ Action-type | Address book |
| Enabling Wi-Fi | After a Wi-Fi switch is enabled, a Wi-Fi apparatus in an electronic device starts searching for a -Wi-Fi signal | Trigger-type/ Action-type | System service |
| Disabling Wi-Fi | After a Wi-Fi switch is disabled, a Wi-Fi apparatus in an electronic device stops searching for a Wi-Fi signal | Trigger-type/ Action-type | System service |
| Creating a reminder item | Create a to-be-reminded item on an electronic device | Trigger-type/ Action-type | Reminder item |
| Sharing to Weibo | An electronic device releases edited content/predefined-format content to Weibo | Trigger-type/ Action-type | Log in to a Weibo account |

In Table 1, for example, the atomic service "storing a new photo" means that a new photo is stored in an album or a gallery. The new photo may be obtained by an electronic device (for example, a mobile phone, a tablet computer, or a notebook computer) by using a camera, or may be obtained from an application program by receiving an operation of a user and stored in the album or the gallery. In the embodiments of this application, obtaining of the new photo is not limited to the foregoing listed cases. For another example, "verifying a fingerprint" means that validity verification is performed on a collected fingerprint. The atomic service needs to use permission to collect a fingerprint. In addition, to protect privacy and data security of the user, the atomic service may be stored only on the electronic device. In the embodiments of this application, creating/producing, activating/running of the task flow may all be based on an atomic service. The various atomic services listed in Table 1 may be stored in a memory of the electronic device, or may be stored on a server on a network side.

Table 2 shows an example of a simple task flow. If a new photo is stored in a gallery app, the electronic device automatically shares the photo to Twitter.

TABLE 2

| Trigger | Action |
| --- | --- |
| A new photo is stored in a gallery | Share to Twitter |

For another example, a simple task flow may be: If a photo is taken by using a camera, the taken photo is stored in a specified album. In the task flow, there are two atomic services: storing a new photo in a gallery and adding a photo to a specified album (the album may be set when a user orchestrates the task flow). Storing of the new photo in the gallery app is a trigger-type atomic service, and adding of the photo to the specified album is an action-type atomic service.

In some other embodiments of this application, to implement more intelligent automatic processing of the electronic device and further improve processing efficiency of the electronic device, in addition to the trigger phase and the action phase, the task flow may further include some intermediate phases, for example, a logic control phase. The logic control phase is mainly used for performing control processing such as condition control processing, branch control processing, and loop control processing. In this phase, logic control is implemented by using a script language. The logic control phase is not an atomic service, but may use the atomic service as an input of the logic control, for example, an input of a system time. For example, as shown in Table 3, one task flow may be: After a new photo is stored in a gallery, it is set that the photo is automatically shared (for example, released) to Twitter at 23:00 on the current day.

TABLE 3

| Trigger | Logic control | Action |
| --- | --- | --- |
| A new photo is stored in a gallery | Execute this action at 23:00 | Share to Twitter |

In some other embodiments of this application, in addition to phases such as the trigger phase, the logic control phase, and the action phase, the task flow may further include a processing phase. This phase is a type of atomic service that can be used for input and output in the task flow. In this phase, an intermediate processing process is performed, and a processed intermediate result is transferred to an atomic service in the action phase, so that the atomic service in the action phase uses the intermediate result as an input, to provide a sufficient condition for action execution. It may be understood that an atomic service in the processing phase may alternatively be included in the action phase, in other words, the atomic service that can be used for input and output may be used as an atomic service in the action phase, and the atomic service provides a data input for an atomic service executed by an action finally.

A task card (Taskcard) may be understood as a visualized interface of a task flow. The card provides an interaction interface between a task flow corresponding to the task card and a user. The user may perform, by using a related interface, displayed on the electronic device, of the task card, an operation on the task card or the task flow corresponding to the task card, for example, operations such as activating or deactivating the task card, and editing a name of the task card. FIG. 4E and FIG. 4F show two examples of the task card. For example, FIG. 4E shows basic information such as a name, a function, required permission, and a developer of the task card, but does not show the task flow corresponding to the task card. A user interface of the task card provided in the embodiments of this application can greatly improve interaction efficiency between the electronic device and the user, and can also improve user experience.

Each task card has one card identifier that is used for uniquely identifying the task card. In the following embodiments of this application, the card identifier may be referred to as a task card ID. Each task card ID uniquely identifies one task card. Because the task card is a visualized interface of the task flow, each task card corresponds to one task flow. In some embodiments of this application, each task flow may also have one task flow identifier (referred to as a task flow ID) that is used for uniquely identifying the task flow. For example, for the foregoing task flow, to facilitate management by the user, the task flow ID, the task card ID, and task flow information may be represented in a classified manner as shown in Table 4.

TABLE 4

| Task flow ID | Task card ID | Basic information of a task flow (automatically sharing to Twitter) | | |
| --- | --- | --- | --- | --- |
| | | Trigger | Logic control | Action |
| 10f447 | 21e88e | A new photo is stored in a gallery/an album | Execute an action at 23:00 | Share to Twitter |

Table 4 shows that a task flow ID of the task flow is 10f447 (hexadecimal), and a corresponding task card ID is 21e88e. Basic information of the task flow includes an atomic service in the trigger phase, and an atomic service in the action phase, and may further include a name of the task flow, for example, a name of the task flow in Table 4 may be "automatically sharing to Twitter".

It may be understood that, because one task card corresponds to one task flow, and each task card has a unique task card ID, a task flow may be identified by using a task card ID without using a task flow ID, or a task flow may be identified by using a task flow ID without using a task card ID, or a task flow ID of a task flow may be the same as a task card ID.

Basic information of the task card can be displayed on a task card, such as a name, a card identifier, a main function, a related atomic service, and required permission of the task card. Certainly, a control may be further displayed on the task card to run or close a task flow corresponding to the task card. For example, the user may run or close a running task flow by performing an interactive operation (for example, tapping, touching and holding, or pressing) on a task card displayed on a touchscreen. Specific details about the task card are described in the following embodiments.

It may be understood that Tables 1 to 4 are merely intended to describe related concepts and meanings of the atomic service, the task flow, and the task card in the embodiments of this application to a person skilled in the art. In another case, the related concepts and meanings of the atomic service, the task flow, the task card, and the like may be described in another manner. The embodiments of this application are not limited to the foregoing descriptions.

It may be understood that the "task flow" is only a term used in the embodiments of this application, a meaning represented by the "task flow" has been described in the embodiments of this application, and a name of the "task flow" cannot constitute any limitation to the embodiments of this application. In addition, in some other embodiments of this application, the "task flow" may also be referred to as another name such as "work flow", "event flow", or "command flow". Similarly, the "task card" mentioned in the embodiments of this application may also be referred to as another name such as "event card", "command card", or "creative card" in some other embodiments.

For example, the following code shows a file format of a simple task flow.

```
<taskflow    id="123456"    name="taskflow1"
icon="http://imqresource/taskflow?id=123456/icon"
    description="This is a sample taskflow." owner="hwuser1"
    published="false"
    lastupdated="20170706045555">
  <actions>
  <action url="http://schemas.huawei.con/apk/res/hwaction/action1 " />
  <action url="http://schemas.huawei.con/apk/res/hwaction/action2" />
  <action url="http://schemas.huawei.con/apk/res/hwaction/action3" />
  </actions>
  <trigger>
     <rule name="rule1">
         $message:Message (status ==0)
         $myDate:Birthday   (status ==1)
     </rule>
  </trigger>
  <flow>
     if (action URL "http://schemas.huawei.com/apk/res/hwaction" );
         b = action ("book ticket");
         if (b.condition = 1)
         action ("action3")
  </flow>
</taskflow>
```

In the foregoing code, the first part describes basic information of the task flow, including a task flow ID, and a task flow name, an icon, a description, a developer, whether the task flow is released, and a latest update time. The first part also describes an action-type atomic service that is to be used. The second part of the foregoing code describes an atomic service in the trigger phase: invoking user information and a rule (rule 1) that is triggered by the task flow. The rule can be considered as an atomic service used for invoking a system. The third part specifically defines the task flow and describes execution logic of several actions. In some other embodiments of this application, the code in the task flow may further include information such as a required permission list and an activation status (yes/no).

FIG. 1 is a schematic architectural diagram of a network system according to an embodiment of this application. As shown in FIG. 1, the network system may include at least one electronic device 100 and a task flow server 200. A hardware structure of the electronic device 100 is shown in FIG. 3, and is specifically described in the following embodiments. An application program referred to as a "task card store (Taskcard store)" is installed on the electronic device 100, as shown by an app icon in FIG. 4A. The application program may perform data communication with the task flow server 200 by using the electronic device 100, so that the task flow server 200 performs management (for example, distribution, synchronization, and permission control of a task card) on a task flow or the task card on the electronic device 100.

The task card store is mainly used for providing a platform for producing/creating, releasing, and downloading a task card. For example, a user produces a task card by using the task card store, and then uploads the produced task card to the task flow server 200. The task flow server 200 releases the task card to a market in the task card store, to allow a user of another electronic device to browse and download the task card. The released task card can be displayed in a related interface of the task card store through synchronization of the released task card to the task flow server 200. The application program can also provide a platform for the user to produce and release various task cards. A user interface and a main function of the task card store are described in detail in the following embodiments.

The task flow server 200 in FIG. 1 is mainly configured to produce and release a task flow, and provide an atomic service open platform for the user, so that a third-party atomic service accesses the task flow server 200 for registration. In addition, the task flow server 200 may further manage a released task flow (that is, a task card). The management may be activating or deactivating the task flow that is executed based on the task flow server 200, or may be managing a software architecture of the task card store, or the like. In addition, the task flow server 200 is further configured to provide services such as access, registration, and status management for an atomic service related to a third party.

In some embodiments of this application, when accessing an atomic service, the service open platform on the task flow server 200 generally uses the HTTPS protocol, and generally carries the following HTTP message header fields:

Accept: application/json
Accept-Charset: utf-8
Accept-Encoding: gzip, deflate
Content-Type: application/json In addition, for an atomic service or an API that needs to be authenticated, the open platform obtains an access token by authenticating a related interface, and carries the access token in an authorization header field. The following is an example:

Authorization: Bearer b29a71b4c58c22af116578a6be6402d2

For each request, the platform generates a random UUID and carries the UUID in an X-Request-ID header field to identify the request. A request for recommending service initiation also carries this header field, to facilitate future fault locating. The following is an example:

X-Request-ID: 7f7cd9e0d8154531bbf36da8fe24b449

A response message for the atomic service can be described in a JSON format and in a UTF8 encoding format. A field related to time in the message can be described according to the ISO8601 standard. Returned data is fed back in the following structure uniformly:

| Parameter name | Mandatory (Yes/No) | Data type | Default value | Description |
| --- | --- | --- | --- | --- |
| code | Yes | Integer | | Operation result code |
| desc | No | String | | Result information |
| data | No | JSONObject | | Returned result data |

In some other embodiments of this application, the network system may further include at least one server 300 of an atomic service provider, and the server 300 may be specifically a web server. The server 300 is mainly configured to register an atomic service with the atomic service open platform on the task flow server, and provide the atomic service for the task flow server. For example, an atomic service "sharing to Twitter" is an atomic service provided by a service provider of an application program "Twitter". For example, when registering the atomic service with the atomic service platform on the task flow server 200, the atomic service provider needs to comply with related specifications and an interface standard. Therefore, when an atomic service is registered with the atomic service open platform, the following information needs to be provided.

| Parameter name | Provider | Parameter description |
| --- | --- | --- |
| client_id | Atomic service provider | A client ID that is provided when a platform used as a client connects to a service and that is used for authentication |
| client_secret | Atomic service provider | A client key that is provided when a platform used as a client connects to a service and that is used for authentication |
| host | Atomic service provider | Service host name(for example. api.service.com) |
| basePath | Atomic service provider | Service base path (for example, /base/v1/service) |
| service_name | Atomic service provider | Service name |
| service_id | Open platform | Automatically allocated by a platform |
| trigger_name | Atomic service provider | Trigger name |
| trigger_field_name | Atomic service provider | Trigger parameter name |
| action_name | Atomic service provider | Action name |
| action_field_name | Atomic service provider | Action parameter name |

During registration with the open platform, for an atomic service that needs to be authenticated, the provider needs to provide an OAuth 2.0 authentication mode and a related authentication interface. In a process of registering the atomic service with the open platform, description information of the service needs to be provided, including description information of the service (including a service name, a host name/domain name, and a basic URL path), authentication information (a client ID and a client key), and a service-related interface (a trigger, an action, and a status check interface, a user information query interface, and the like). One service has at least one trigger or one action. The foregoing information may be described by using Swagger JSON.

To ensure that a registered atomic service (especially an atomic service provided by the third party) can be run normally, the task flow server 200 may periodically obtain a status (available or unavailable) of the atomic service by using a general-purpose interface defined by the service open platform. The general-purpose interface may be designed as an interface that does not need to be authenticated. The task flow server 200 may obtain the status of the atomic service by using the HTTPS protocol. For example, the task flow server 200 may send query request information, where a request header parameter is as follows:

| Parameter name | Mandatory (Yes/No) | Data type | Default value | Description |
| --- | --- | --- | --- | --- |
| Authorization | Yes | String | | User access authorization code (access_token) obtained by using an authentication interface |

The task flow server 200 may receive the following corresponding result code:

| Response code | Return code | Description |
| --- | --- | --- |
| 200 | 0 | An atomic service is available |
| 503 | 1 | An atomic service is unavailable |

Figure 2A:
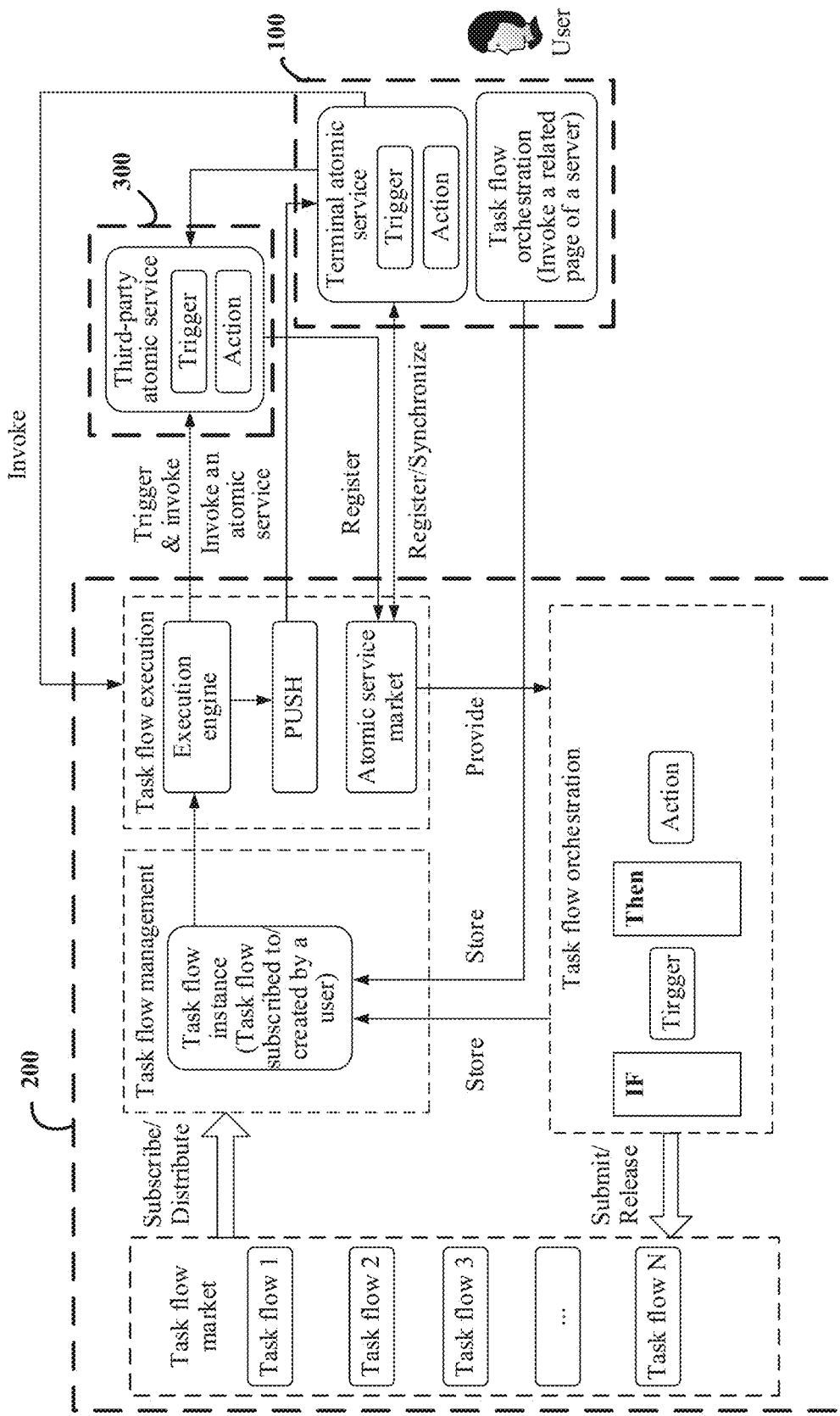
FIG. 2A is a schematic diagram of a network architecture according to some embodiments.

FIG. 2A is an introductory block diagram of a procedure related to a task flow according to an embodiment of this application. In FIG. 2A, the procedure may be task flow orchestration, a task flow market, task flow management, task flow execution, and the like. A developer may develop a specific task flow by using a task flow orchestrator. In this embodiment of this application, a server on a network side may provide a task flow orchestration platform with a unified standard. The orchestration platform may alternatively be implemented on an electronic device, thereby facilitating participation in the task flow orchestration by a user. A specific orchestration manner is described in detail in the following embodiments. After orchestration of one task flow is completed, the developer can submit or release the task flow to the task flow market by using a wireless network. A user of the electronic device may subscribe to various task flows in the task flow market, for example, may subscribe to a social-type task flow. In this case, once a new social-type task flow is released in the market next time, the server on the network side, for example, the task flow server 200 in FIG. 1, may push a related message to the electronic device, thereby facilitating obtaining of the message by the user in time. Certainly, the user may further download, from the electronic device, a task flow stored on the server, and then activate the task flow on the electronic device. After being activated, the task flow may be executed on the server 200 on the network side, and the atomic service on the electronic device may be invoked in a push manner to assist in completing execution of the task flow. In some other embodiments of this application, after the task flow is activated, the server may further trigger or invoke an atomic service on a third-party server (for example, the server 300 in FIG. 1). An atomic service market is used for providing the developer with a distribution platform of a registered atomic service. The developer can invoke an atomic service in the market during task flow orchestration. The atomic service in the market may be a third-party atomic service, or may be an atomic service of the electronic device. Generally, to provide standardized and unified service experience for the user and the developer, these atomic services need to be registered with the atomic service market before being invoked during task flow orchestration. In addition, to ensure that the user has consistent experience when the user orchestrates the task flow on the electronic device and when the user orchestrates the task flow by using an orchestrator on the server, the registered atomic service on the server may be synchronized with the atomic service on the electronic device. Specifically, when the user triggers task flow orchestration on the electronic device, the electronic device may send an atomic service synchronization request to the server by using the wireless network. In this way, the server can synchronize the registered atomic service to the electronic device.

In some other embodiments of this application, the user of the electronic device may further orchestrate the task flow on the electronic device by invoking a related page of the server, and the orchestrated task flow may be stored on the server. Both a mobile phone user and a professional developer can develop a task flow by using the orchestrator. The orchestrated task flow can be distributed by using the task flow market. The user can search for a required task flow by using functions such as market search and column and then activate the task flow. After the user activates the task flow, an instance of the task flow is generated on the server, and may be downloaded to the electronic device of the user by using the wireless network. It may be understood that there is a task flow execution environment on both the server and the electronic device, and the execution environment determines, based on a location of an atomic service in a trigger phase of the task flow, whether the task flow is executed on the server side or the electronic device side. Once the atomic service is triggered, the atomic service is run based on parsing of a grammar chain of the task flow. It may be understood that the related procedure of the task flow shown in FIG. 2A may be cooperatively completed by the task flow server 200, the electronic device 100, and the at least one server 300 of the atomic service provider in FIG. 1.

Figure 2B:
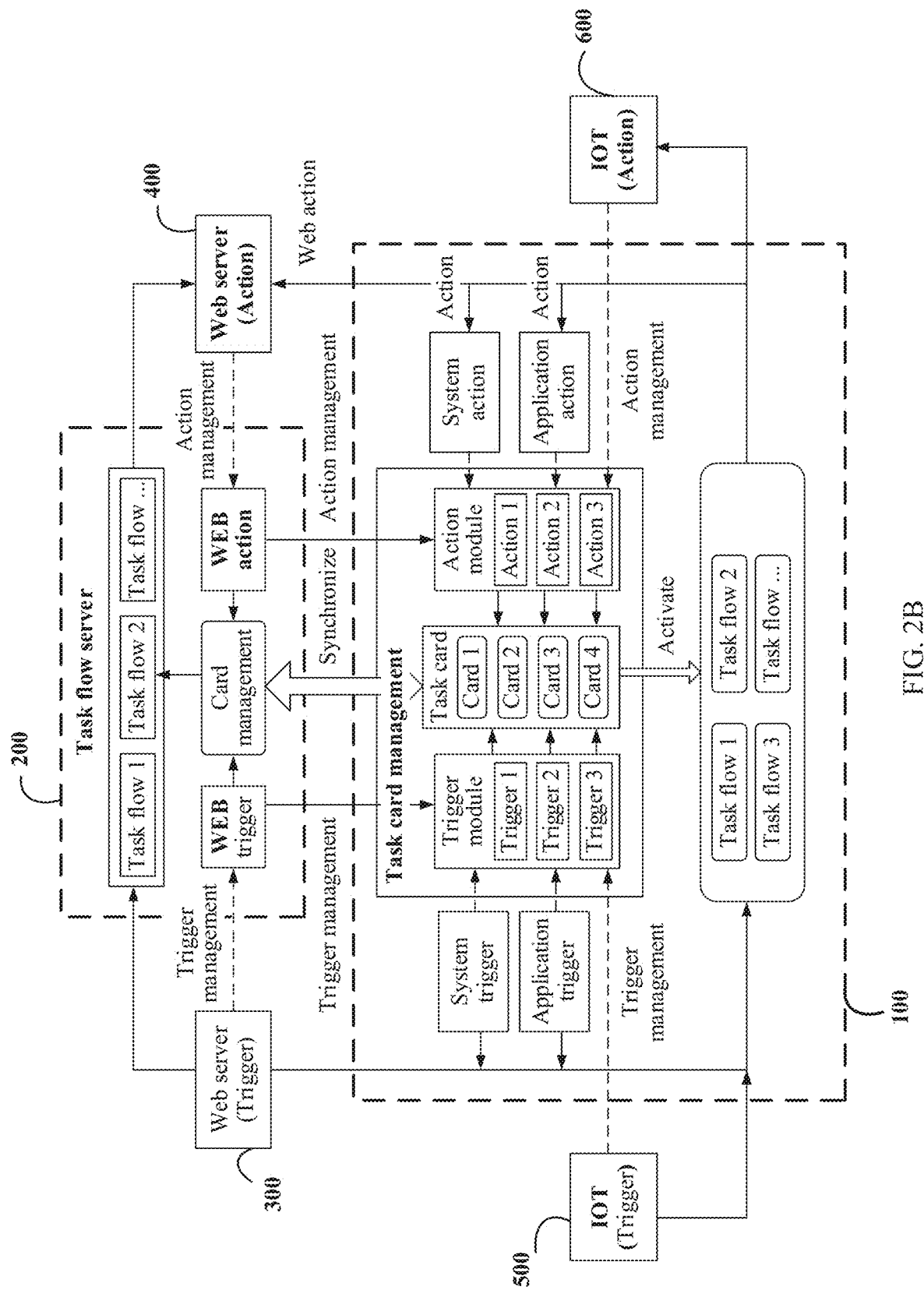
FIG. 2B is a schematic diagram of a network architecture and task flow deployment according to some embodiments.

FIG. 2B shows a communications system shown in FIG. 1 from a perspective of two phases related to a task flow. In FIG. 2B, the task flow server 200 stores a plurality of task flows (for example, a task flow 1 and a task flow 2). A trigger phase of the task flows may be related to a third-party server 300 (for example, a web server that provides a trigger-type atomic service), or the trigger phase may be related to an internet of things device 500 (for example, a smart refrigerator) that provides a trigger-type atomic service. It may be understood that an action phase of the task flows may also be related to a third-party server (for example, a web server that provides an action-type atomic service), or may be related to an internet of things device 600 (for example, a smart air conditioner) that provides an action-type atomic service. The user may centrally manage atomic services on the internet of things device 500 and the internet of things device 600 on the electronic device 100, and then synchronize these atomic services to the task flow server 200. It may be understood that the atomic service may alternatively be uploaded by the electronic device 100 to the task flow server 200, and then be managed by the task flow server 200. On the electronic device 100, because the atomic service is synchronized to the task flow server, a task flow may alternatively be orchestrated on the electronic device 100, and the task flow is synchronized to the server 200. A task card activated on the electronic device 100 may execute a task flow corresponding to the task card.

An electronic device, a graphical user interface (which may be briefly referred to as GUI below) used for such an electronic device, and an embodiment used for an associated process in which such an electronic device is used are described in the following. In some embodiments of this application, the electronic device may be a portable electronic device, such as a mobile phone, a tablet computer, or a wearable device (for example, a smartwatch) with a wireless communication function, where the portable electronic device further includes another function, for example, a personal digital assistant function and/or a music player function. An example embodiment of the portable electronic device includes but is not limited to a portable electronic device using iOS®, Android®, Microsoft®, or another operating system. The portable electronic device may alternatively be another portable electronic device, for example, a laptop computer (Laptop) with a touch-sensitive surface (for example, a touch panel). It should be further understood that, in some other embodiments of this application, the electronic device may alternatively not be a portable electronic device, but be a desktop computer with a touch-sensitive surface (for example, a touch panel).

For example, as shown in FIG. 3, an electronic device in an embodiment of this application may be a mobile phone 100. The mobile phone 100 is used as an example below to describe the embodiments in detail. It should be understood that the mobile phone 100 shown in the figure is merely an example of the electronic device, and the mobile phone 100 may include more or fewer components than those shown in the figure, may combine two or more components, or may have different component configurations. Various components shown in the figure may be implemented in hardware, software, or in a combination of hardware and software that includes one or more signal processing and/or application-specific integrated circuits.

As shown in FIG. 3, the mobile phone 100 may specifically include components such as one or more processors 101, a radio frequency (radio frequency, RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power apparatus 111. These components may perform communication by using one or more communications buses or signal lines (not shown in FIG. 3). A person skilled in the art may understand that a hardware structure shown in FIG. 3 does not constitute a limitation to the mobile phone 100, and the mobile phone 100 may include more or fewer components than those shown in the figure, or some components are combined, or the mobile phone 100 has different component arrangements.

The following describes the components of the mobile phone 100 in detail with reference to FIG. 3.

The processor 101 is a control center of the mobile phone 100, and connects to various components of the mobile phone 100 by using various interfaces and lines. The processor 101 executes various functions of the mobile phone 100 and processes data by running or executing an application program (application, App for short) stored in the memory 103 and invoking data and an instruction that are stored in the memory 103. In some embodiments, the processor 101 may include one or more processing units. The processor 101 may further integrate an application processor and a modem processor. The application processor mainly processes an operating system, a user interface, an application, and the like. The modem processor mainly processes wireless communication. It may be understood that, the modem processor may alternatively not be integrated into the processor 101. For example, the processor 101 may be a Kirin 960 chip manufactured by Huawei Technologies Co., Ltd. In some other embodiments of this application, the processor 101 may further include a fingerprint verification chip, configured to verify a collected fingerprint.

The radio frequency circuit 102 may be configured to receive and send a radio signal in an information receiving and sending process or a call process. Specifically, after receiving downlink data from a base station, the radio frequency circuit 102 may send the downlink data to the processor 101 for processing. In addition, the radio frequency circuit 102 sends uplink data to the base station. Generally, the radio frequency circuit 140 includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to a global system for mobile communications, a general packet radio service, code division multiple access, wideband code division multiple access, long term evolution, email, an SMS message service, and the like.

The memory 103 is configured to store an application program and data. The processor 101 runs the application program and the data stored in the memory 103, to execute various functions of the mobile phone 100 and process data. The memory 103 mainly includes a program storage area and a data storage area. The program storage area may store an operating system, and an application program required by at least one function (for example, a sound playing function or an image playing function). The data storage area may store data (for example, audio data or a phonebook) created based on use of the mobile phone 100. In addition, the memory 103 may include a high-speed random access memory, and may further include a non-volatile memory such as a magnetic disk storage device, a flash memory device, or another non-volatile solid-state storage device. The memory 103 may store various operating systems such as an iOS® operating system developed by Apple Inc. and an Android® operating system developed by Google Inc. For example, the memory 103 stores an application program related to this embodiment of this application, for example, a task card store, Twitter, a phonebook, or WEIBO.

The touchscreen 104 may include a touch-sensitive surface 104-1 and a display 104-2. The touch-sensitive surface 104-1 (for example, a touch panel) may collect a touch event of a user of the mobile phone 100 on or near the touch-sensitive surface 104-1 (for example, an operation performed by the user on the touch-sensitive surface 104-1 or near the touch-sensitive surface 104-1 by using any proper object such as a finger or a stylus), and send collected touch information to another component, for example, the processor 101. The touch event of the user near the touch-sensitive surface 104-1 may be referred to as a floating touch. The floating touch may mean that the user does not need to directly come into contact with a touchpad to select, move, or drag a target (for example, an app icon), and the user only needs to be near the electronic device to execute a wanted function. In an application scenario of the floating touch, terms such as "touch" and "contact" do not imply a direct contact with the touchscreen 104, but a contact near or close to the touchscreen. The touch-sensitive surface 104-1 on which the floating touch can be performed may be implemented by using capacitance, infrared sensing, an ultrasonic wave, or the like. The touch-sensitive surface 104-1 may include two parts: a touch detection apparatus and a touch controller. The touch detection apparatus detects a touch orientation of the user, detects a signal generated by a touch operation, and transfers the signal to the touch controller. The touch controller receives touch information from the touch detection apparatus, converts the touch information into touch point coordinates, and sends the touch point coordinates to the processor 101. The touch controller may further receive an instruction sent by the processor 101, and execute the instruction. In addition, the touch-sensitive surface 104-1 may be implemented in a plurality of types, such as a resistive type, a capacitive type, an infrared type, and a surface acoustic wave type. The display (also referred to as a display screen) 104-2 may be configured to display information entered by the user or information provided for the user, and various menus of the mobile phone 100. The display 104-2 may be configured in a form such as a liquid crystal display, or an organic light-emitting diode. The touch-sensitive surface 104-1 may cover the display 104-2. After detecting a touch event on or near the touch-sensitive surface 104-1, the touch-sensitive surface 104-1 transfers the touch event to the processor 101 to determine a type of the touch event. Then, the processor 101 may provide a corresponding visual output on the display 104-2 based on the type of the touch event. Although in FIG. 2, the touch-sensitive surface 104-1 and the display screen 104-2 are used as two independent parts to implement input and output functions of the mobile phone 100, in some embodiments, the touch-sensitive surface 104-1 and the display screen 104-2 may be integrated to implement the input and output functions of the mobile phone 100. It can be understood that the touchscreen 104 is formed by stacking a plurality of layers of materials. Only the touch-sensitive surface (layer) and the display screen (layer) are presented in the embodiments of this application, and other layers are not described in the embodiments of this application. In addition, in some other embodiments of this application, the touch-sensitive surface 104-1 may cover the display 104-2, and a size of the touch-sensitive surface 104-1 is greater than a size of the display screen 104-2. Therefore, the display screen 104-2 is entirely covered by the touch-sensitive surface 104-1. Alternatively, the touch-sensitive surface 104-1 may be configured on the front of the mobile phone 100 in a full panel form, in other words, any touch performed by the user on the front of the mobile phone 100 can be sensed by the mobile phone. In this way, full touch experience on the front of the mobile phone can be implemented. In some other embodiments, the touch-sensitive surface 104-1 is configured on the front of the mobile phone 100 in the full panel form, and the display screen 104-2 may also be configured on the front of the mobile phone 100 in the full panel form. In this way, a bezel-less structure can be implemented on the front of the mobile phone. In some other embodiments of this application, the touchscreen 104 may further include a series of pressure sensor arrays, so that the mobile phone can sense pressure applied to the touchscreen 104 by a touch event.

The mobile phone 100 may further include the Bluetooth apparatus 105, configured to implement data exchange between the mobile phone 100 and another electronic device (for example, a mobile phone or a smartwatch) at a short distance from the mobile phone 100. In the embodiments of this application, the Bluetooth apparatus may be an integrated circuit, a Bluetooth chip, or the like.

The mobile phone 100 may further include at least one type of sensor 106, such as a light sensor, a motion sensor, and another sensor. Specifically, the light sensor may include an ambient light sensor and a proximity sensor. The ambient light sensor may adjust luminance of the display of the touchscreen 104 based on intensity of ambient light. The proximity sensor may power off the display when the mobile phone 100 approaches an ear. As a motion sensor, an accelerometer sensor may detect a value of an acceleration in each direction (three axes generally), may detect a value and a direction of gravity in a static mode, and may be applied to an application used for recognizing a mobile phone gesture (for example, screen switching between a landscape mode and a portrait mode, a related game, and magnetometer posture calibration), a function related to vibration recognition (for example, a pedometer or a knock), and the like.

In some embodiments of this application, the sensor 106 may further include a fingerprint sensor. For example, a fingerprint sensor 112 may be configured on the back side of the mobile phone 100 (for example, below a rear-facing camera), or a fingerprint sensor 112 may be configured on the front side of the mobile phone 100 (for example, below the touchscreen 104). In addition, the fingerprint sensor 112 may be configured in the touchscreen 104 to implement a fingerprint recognition function. In other words, the fingerprint sensor 112 may be integrated with the touchscreen 104 to implement the fingerprint recognition function of the mobile phone 100. In this case, the fingerprint sensor 112 may be configured in the touchscreen 104 as a part of the touchscreen 104, or may be configured in the touchscreen 104 in another manner. In addition, the fingerprint sensor 112 may alternatively be implemented as a full-panel fingerprint sensor, and therefore, the touchscreen 104 may be considered as a panel on which a fingerprint may be collected at any location. The fingerprint sensor 112 may send a collected fingerprint to the processor 101, so that the processor 101 processes the fingerprint (for example, verify the fingerprint). In the embodiments of this application, the fingerprint sensor 112 may use any type of sensing technology, including but not limited to an optical sensing technology, a capacitive sensing technology, a piezoelectric sensing technology, an ultrasonic sensing technology, or the like. In addition, for a specific technical solution of integrating the fingerprint sensor into the touchscreen in the embodiments of this application, refer to patent application No. US 2015/0036065 A1, announced by the United States Patent and Trademark Office, entitled "FINGERPRINT SENSOR IN ELECTRONIC DEVICE", which is incorporated by reference in its entirety in the embodiments of this application.

Other sensors such as a gyroscope, a barometer, a hygrometer, a thermometer, and an infrared sensor may be configured in the mobile phone 100. Details are not described herein.

The Wi-Fi apparatus 107 is configured to provide, for the mobile phone 100, network access that complies with a Wi-Fi-related standard or protocol. The mobile phone 100 may access a Wi-Fi access point by using the Wi-Fi apparatus 107, to help the user receive and send an email, browse a web page, access streaming media, and the like. The Wi-Fi apparatus 107 provides a wireless broadband internet access for the user. In some other embodiments, the Wi-Fi apparatus 107 may also be used as a Wi-Fi wireless access point, and may provide Wi-Fi network access for another electronic device.

The positioning apparatus 108 is configured to provide a geographic location for the mobile phone 100. It can be understood that the positioning apparatus 108 may be specifically a receiver of a positioning system, such as a global positioning system (global positioning system, GPS) or a BeiDou navigation satellite system. After receiving a geographical location sent by the positioning system, the positioning apparatus 108 sends the information to the processor 101 for processing, or sends the information to the memory 103 for storage. In some other embodiments, the positioning apparatus 108 may be a receiver of an assisted global positioning system (assisted global positioning system, AGPS). The AGPS runs in a manner in which GPS positioning is performed with mobile assistance. By using a signal of a base station together with a GPS satellite signal, the AGPS can enable a positioning speed of the mobile phone 100 to be higher. In the AGPS system, the positioning apparatus 108 may obtain positioning assistance through communication with an assisted positioning server (for example, a positioning server of the mobile phone 100). As an assisted server, the AGPS system assists the positioning apparatus 108 in completing ranging and positioning services. In this case, the assisted positioning server provides positioning assistance through communication with the positioning apparatus 108 (namely, a receiver of the GPS) of the electronic device such as the mobile phone 100 by using a wireless communications network. In some other embodiments, the positioning apparatus 108 may alternatively be a positioning technology based on a Wi-Fi access point. Each Wi-Fi access point has a globally unique MAC address, and the electronic device can scan and collect a broadcast signal of a surrounding Wi-Fi access point when Wi-Fi is enabled. Therefore, the electronic device can obtain a MAC address broadcast by the Wi-Fi access point. The electronic device sends such data (for example, the MAC address) that can identify the Wi-Fi access point to a location server by using the wireless communications network. The location server retrieves a geographical location of each Wi-Fi access point, calculates a geographical location of the electronic device with reference to strength of the Wi-Fi broadcast signal, and sends the geographical location of the electronic device to the positioning apparatus 108 of the electronic device.

The audio circuit 109, a speaker 113, and a microphone 114 may provide an audio interface between the user and the mobile phone 100. The audio circuit 109 may transmit, to the loudspeaker 113, an electrical signal converted from received audio data, and the loudspeaker 113 converts the electrical signal into a sound signal for outputting. In another aspect, the microphone 114 converts a collected sound signal into an electrical signal. The audio circuit 109 receives the electrical signal, converts the electrical signal into audio data, and then outputs the audio data to the RF circuit 102, to send the audio data to, for example, a mobile phone, or outputs the audio data to the memory 103 for further processing.

The peripheral interface 110 is configured to provide various interfaces for an external input/output device (for example, a keyboard, a mouse, an external display, an external memory, and a subscriber identity module card). For example, the mouse is connected by using a universal serial bus interface, and the subscriber identity module (subscriber identity module, SIM) card provided by a telecommunications operator is connected by using a metal contact in a subscriber identity module card slot. The peripheral interface 110 may be configured to couple the external input/output peripheral device to the processor 101 and the memory 103.

The mobile phone 100 may further include a power supply apparatus 111 (for example, a battery and a power supply management chip) that supplies power to the components. The battery may be logically connected to the processor 101 by using the power supply management chip, so that functions such as charging, discharging, and power consumption management are implemented by using the power supply apparatus 111.

Although not shown in FIG. 3, the mobile phone 100 may further include a camera, for example, a front-facing camera or a rear-facing camera. The front-facing camera may be configured to capture facial feature information. The processor 101 may perform facial recognition on the facial feature information, and then perform subsequent processing. The mobile phone 100 may further include a camera flash, a micro projection apparatus, a near field communication (near field communication, NFC) apparatus, and the like. Details are not described herein.

The following embodiments may be all implemented on an electronic device (for example, the mobile phone 100 or a tablet computer) with the foregoing hardware structure.

Figure 4A:
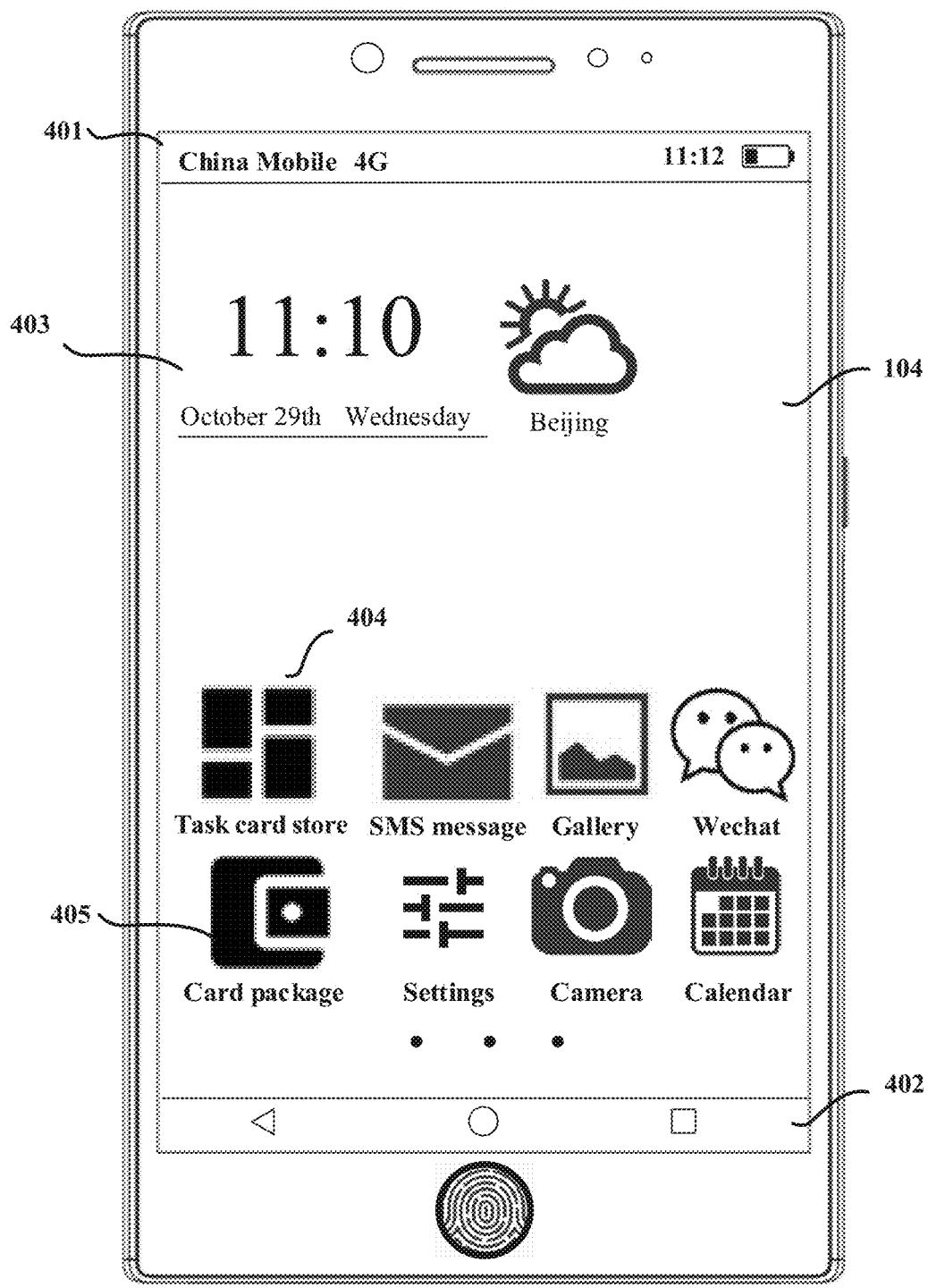
FIG. 4A to FIG. 4F are schematic diagrams of some graphical user interfaces displayed on an electronic device according to some embodiments.

For example, FIG. 4A shows a graphical user interface (graphical user interface, GUI) displayed on the electronic device 100 such as a touchscreen 104 of a mobile phone. The GUI is one of home screens (Home Screen) of the electronic device. The home screen may include a status bar 401, a hidden navigation bar 402, a time widget, and a weather widget, and may further include icons of a plurality of application programs, for example, a task card store icon 404 and a task card package icon 405. It may be understood that, in some other embodiments, the home screen may further include a dock bar, and the dock bar may include a commonly-used app icon and the like. After the mobile phone detects a touch event of a finger (or a stylus or the like) of a user for a specific app icon, in response to the touch event, the mobile phone may open a user interface of an app corresponding to the app icon.

In some other embodiments, the electronic device may further include a home screen key. The home screen key may be a physical key, or may be a virtual key. The home screen key is configured to return, based on an operation of the user, to a specific page of the home screen from a GUI displayed on the touchscreen, so that the user may conveniently view the home screen at any time, and perform an operation on a control (for example, an icon) on the home screen. The foregoing operation may be specifically that the user presses the home screen key, or the user presses the home screen key twice in succession in a short time period, or the user presses and holds the home screen key. In some other embodiments of this application, the home screen key may further be integrated with the fingerprint sensor 112. In this way, when the user presses the home screen key, the electronic device may subsequently collect a fingerprint to confirm an identity of the user.

Figure 4B:
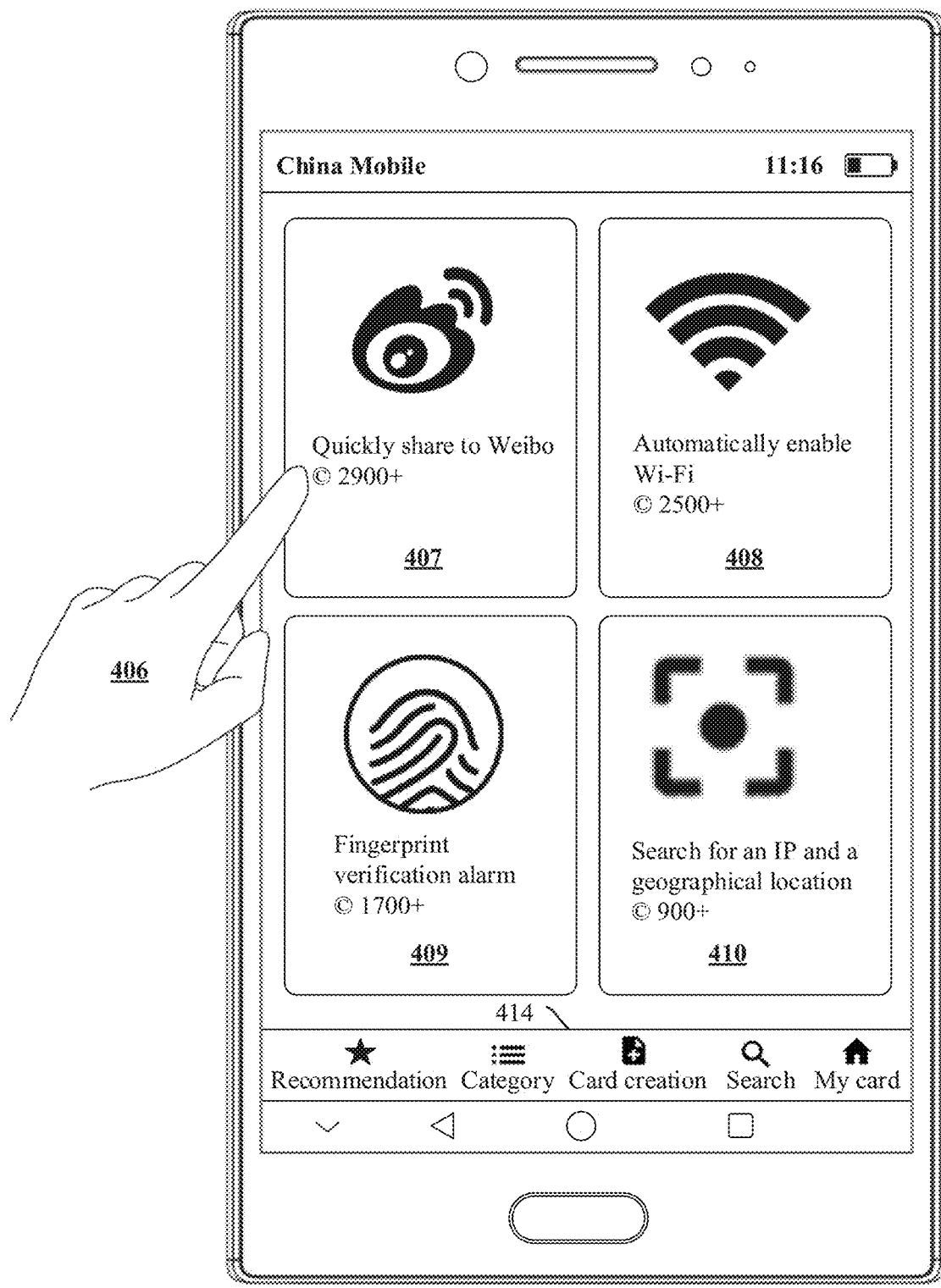

As shown in FIG. 4B, after the electronic device detects a touch event performed by a finger of the user for the task card store icon 404, in response to the touch event, a touchscreen of the electronic device may display a home screen of a task card store. The home screen may include a task card market, a dock bar, and the like. The task card market may display a task card with a comparatively large quantity of purchases. The dock bar may include several bars: recommendation, category, search, and my card. The recommendation bar shows a hot task card, and the category bar shows classification according to a main function of the task card. For example, some task cards are used for taking a photo and sharing the photo to WEIBO, so that these task cards are classified into a social type. For another example, if some task cards are used for automatically enabling Wi-Fi after a specified location is reached, these task cards are classified into a tool type. The search bar may be used to search for a corresponding task card by using a keyword related to the task card. My card bar shows a task card purchased from the task card market.

A plurality of task cards may be displayed in the task card market. Basic information such as an icon, a name, an activation quantity, user comments, and functions of each task card may be displayed to the user of the mobile phone, thereby facilitating viewing by the user. For example, in FIG. 4B, four task cards are displayed on the touchscreen, where a task card 407 indicates that a name of the task card is "quickly sharing to WEIBO", and a quantity of purchases is more than 2900; and a name of a task card 408 is "automatically enabling Wi-Fi", and a quantity of purchases of the task card 408 is more than 2500.

Figure 4C:
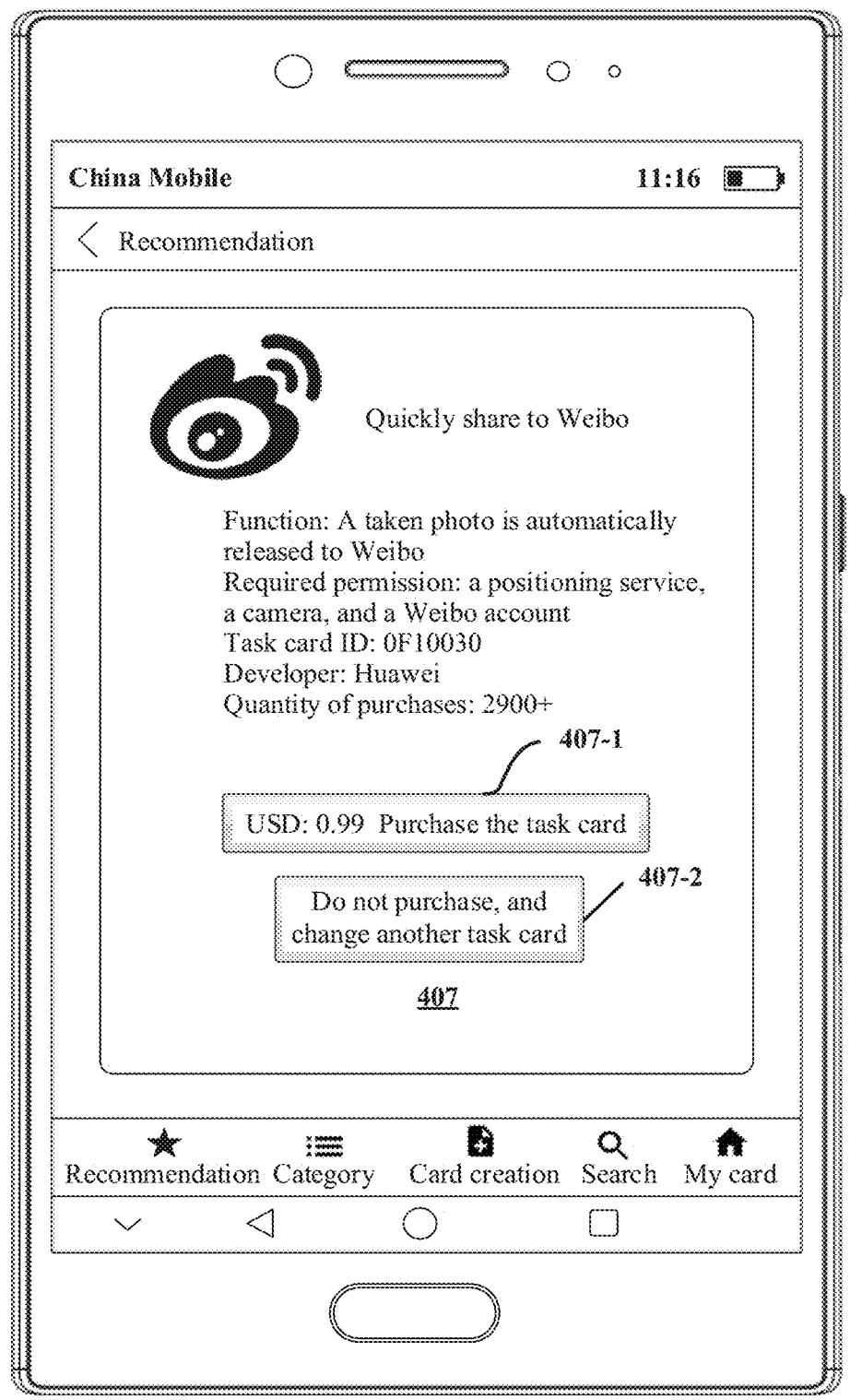

For example, after the electronic device detects a touch event of the user for the task card 407 in FIG. 4B, in response to the touch event, a GUI related to the task card 407 may be displayed on the touchscreen of the electronic device, and basic information of the task card 407 is displayed on the GUI, as shown in FIG. 4C. In FIG. 4C, basic information related to the task card, such as an icon, a name, a function, a developer, a quantity of purchases, required permission, and a task card ID of the task card, is displayed. In addition, a control 407-1 may be further displayed in the GUI. The control 407-1 is configured to purchase the task card in response to an input of the user. Purchasing the task card is actually purchasing a task flow corresponding to the task card. In this way, the user can activate the task flow at any time when necessary, and the activated task flow can be automatically run in the background of the mobile phone. In some other embodiments of this application, after the user taps the control 407-1, the mobile phone may alternatively download the task card from the task flow server 200 on the network side and activate the task card. In some other embodiments of this application, a control 407-2 may be further displayed in FIG. 4C. The control 407-2 is configured to display a GUI of another task card on the touchscreen in response to an input of the user, or display a series of task cards on the touchscreen in response to an input of the user, thereby facilitating selection by the user.

Figure 4D:
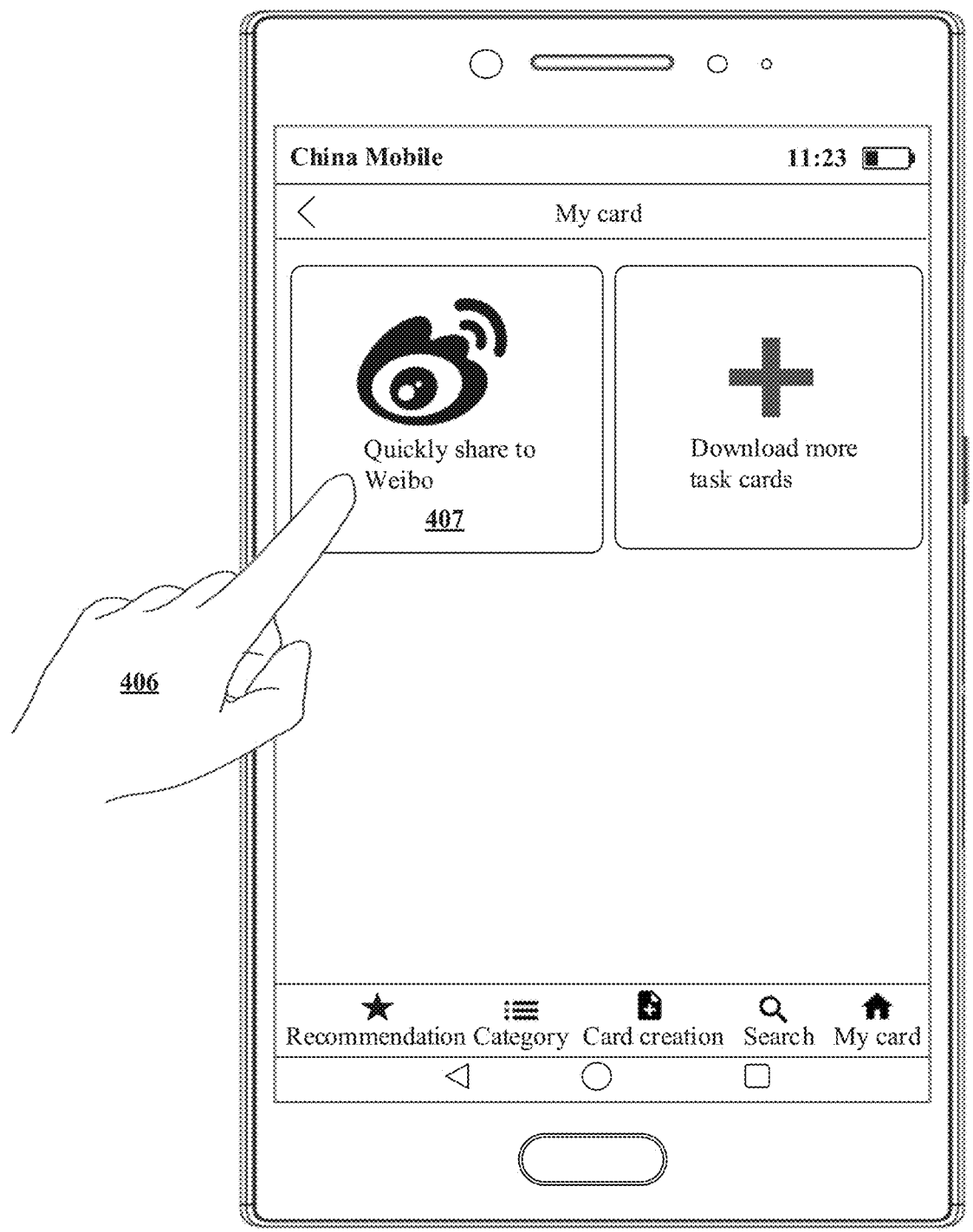
Figure 4E:
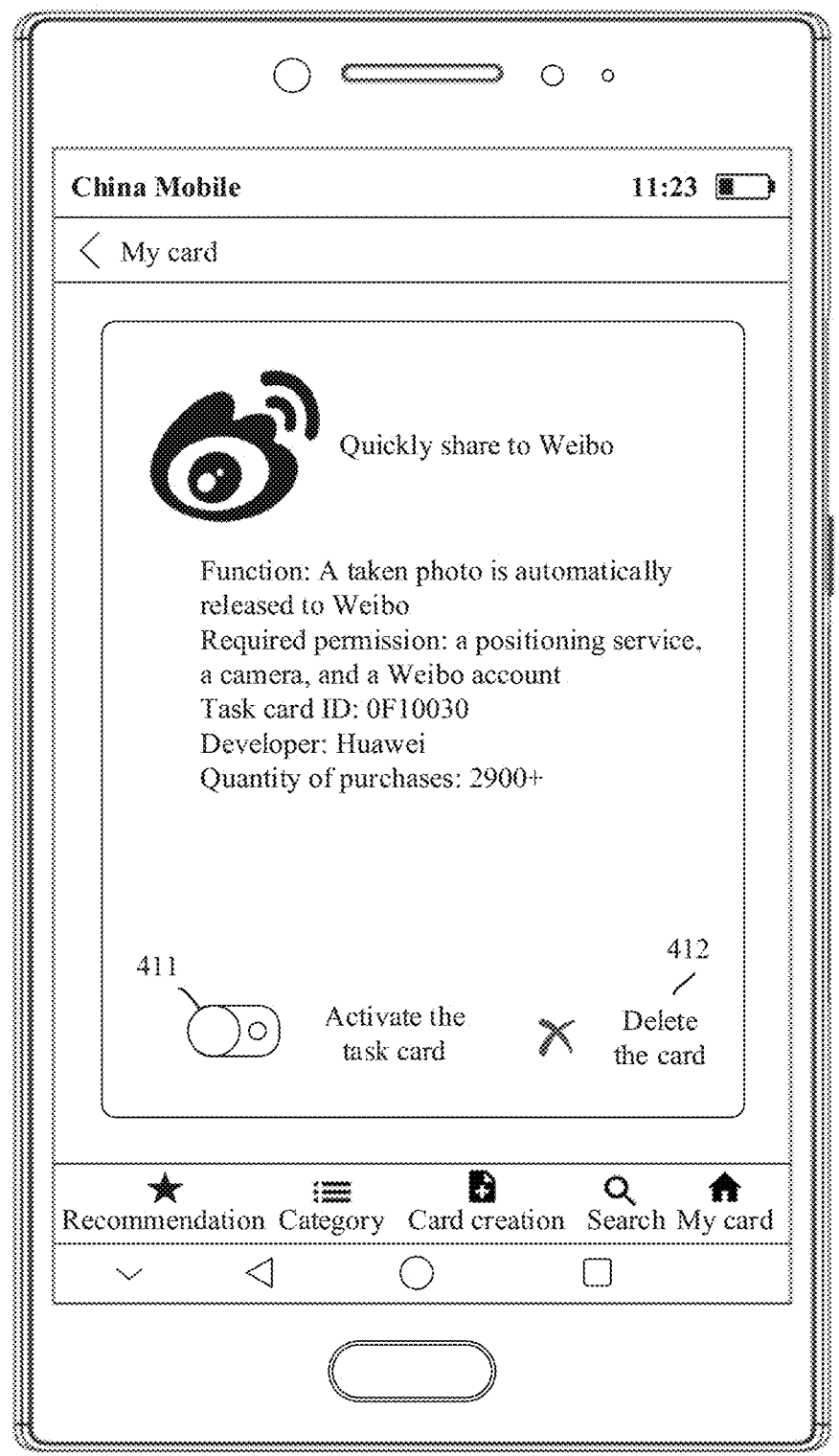
Figure 4F:
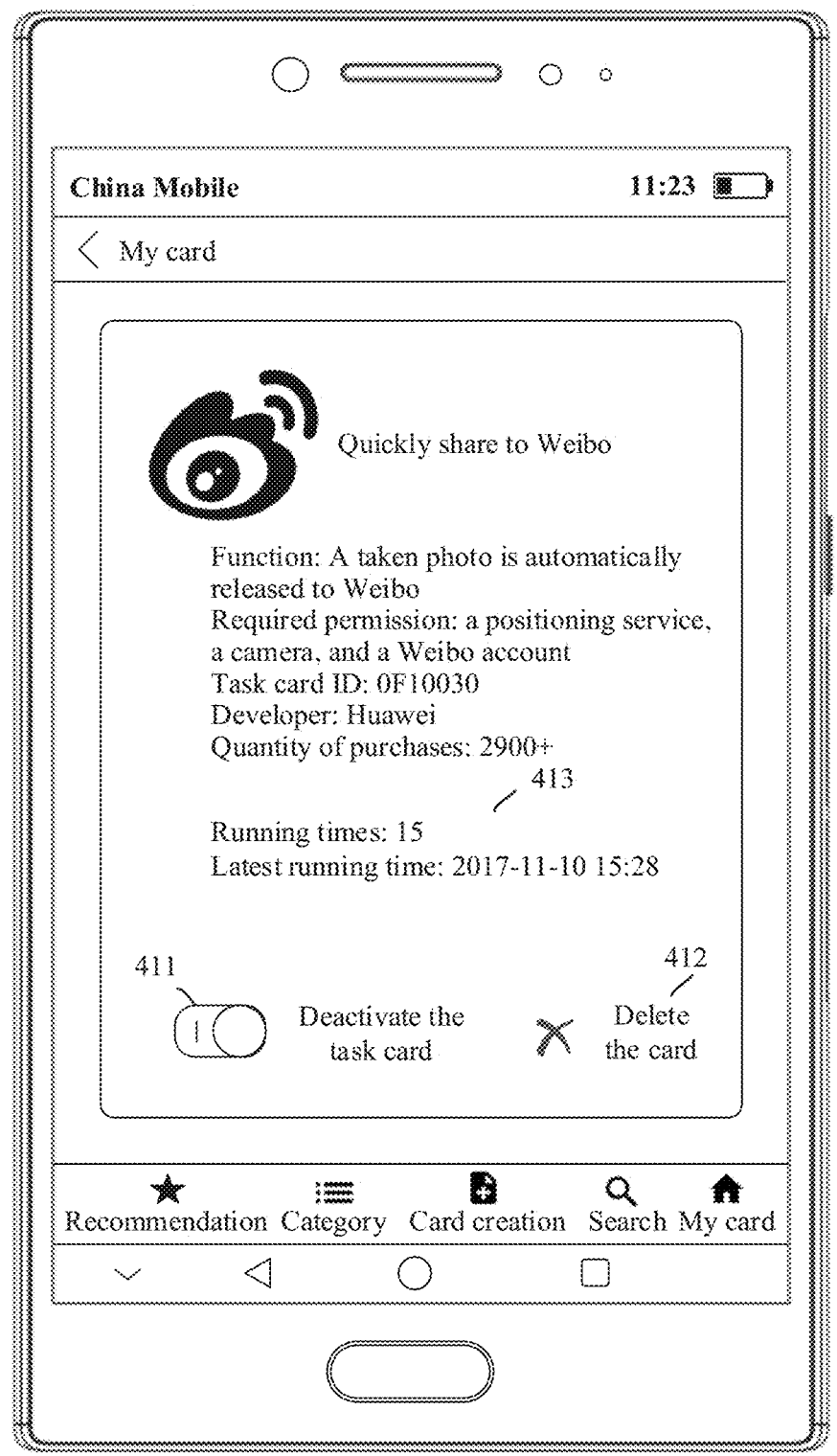

The user can tap "my card" in the dock bar to view purchased task cards, as shown in FIG. 4D. FIG. 4D shows task cards purchased by the user in the task card market. The user may tap one of the task cards to view detailed information of the card. FIG. 4E shows a GUI in respond to a tap operation of the user. Basic information related to the task card is displayed in the GUI. A control 411 and a control 412 may be further displayed in the GUI. The control 411 is configured to activate or deactivate the task card. After the task card is activated, a task flow corresponding to the task card is automatically run on the mobile phone, and may interact with the user by using various interfaces during running. For example, during automatic running of a task flow that has a logic control phase, a prompt dialog box may be displayed for the user to confirm an execution condition (for example, filtering or selecting) in the logic control phase. The activated task card may also be deactivated through an operation of the user, and the operation of the user may also be a touch event of the user for the control 411. The control 412 is configured to delete the task card from a storage of the mobile phone. After the task card is deleted, a task flow corresponding to the task card is no longer stored on the mobile phone. The user may download the task card from the task flow server 200 in another manner, and reactivate the task card on the mobile phone.

It may be understood that a function of the task flow is automatic running a program, and user participation is not required as much as possible (for example, the user performs an operation on the electronic device). Therefore, the task flow may be automatically run without being perceived by the user. After activating the task card corresponding to the task flow in the task card store, the user needs to determine, in a related user interface, that the task card is automatically run. In this case, the task flow does not require a subsequent operation of the user and is automatically run when a trigger event occurs.

It may be understood that, although running of the task flow may not require the operation of the user, the electronic device may prompt the user with a running result of the task flow. Therefore, for example, in some other embodiments of this application, after running of one task flow is completed, prompt information, for example, "a photo 1 is automatically released to WEIBO, and please tap here to view details (a task flow 1)", may be displayed in the status bar on the touchscreen of the electronic device. The prompt information indicates that the task flow 1 is run in the background and a running result is fed back to the user. In some other embodiments of this application, after the user opens the task card 407 shown in FIG. 4D, running information 413 of the task flow corresponding to the task card may be displayed in a GUI shown in FIG. 4F, for example, a time when the task flow is run, a latest time when the task flow is run, and a total quantity of running times of the task flow. In this way, the user may view the running information of the task flow at any time when convenient, and may even tap the control 411 to activate the task card corresponding to the task flow when necessary, or tap the control 412 to delete the task flow, thereby resolving a problem that the task flow may cause system overload due to running of the task flow in the background, and improving efficiency of the electronic device. It may be understood that the running information 413 may alternatively be sent by the electronic device to the task flow server 200 by using a wireless network, so that the task flow server 200 performs data analysis, to provide a more accurate management service of the task flow for the electronic device.

Figure 5A:
FIG. 5A and FIG. 5B are schematic diagrams of some other graphical user interfaces displayed on an electronic device according to some embodiments.
Figure 5B:
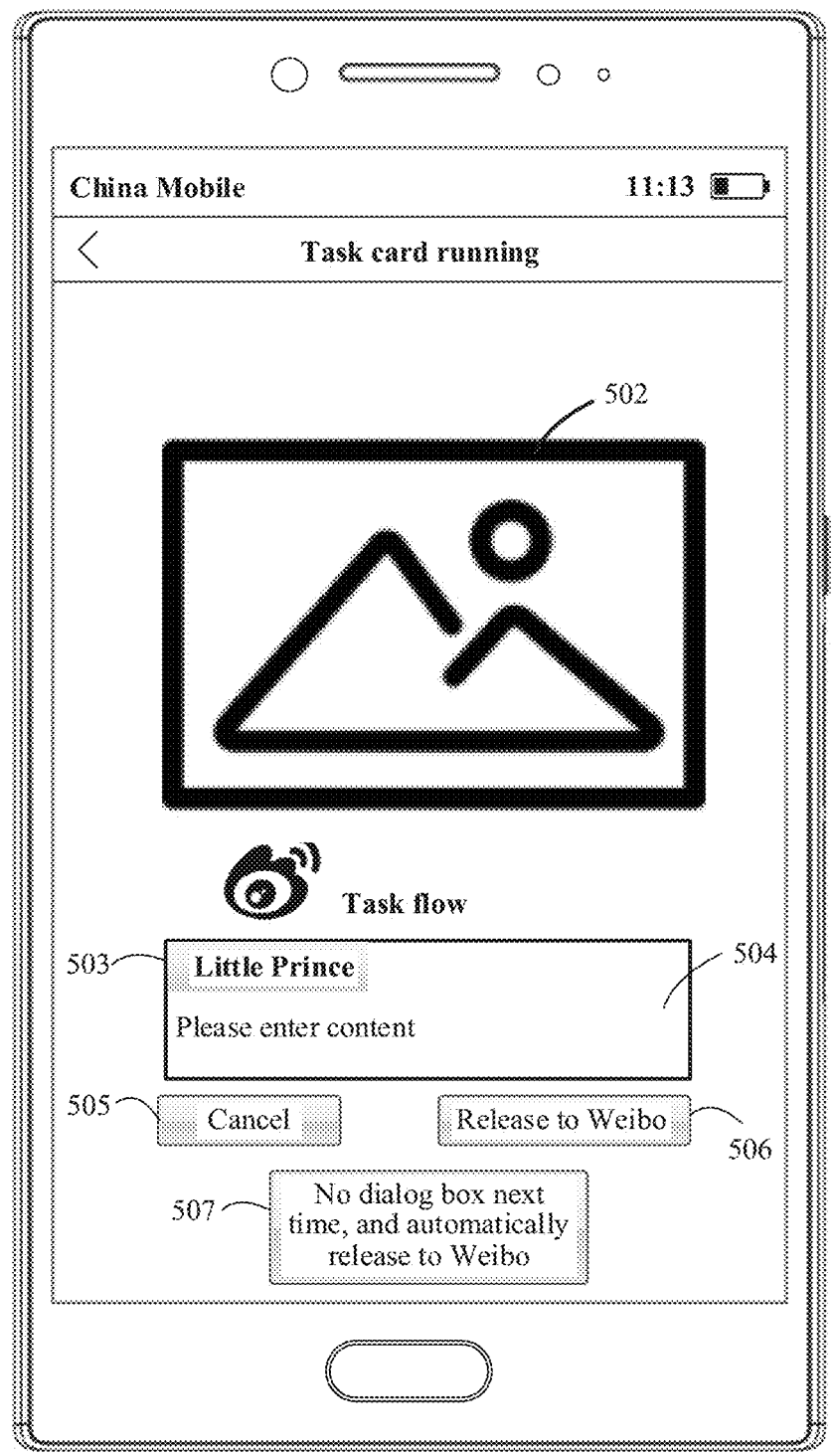

In some other embodiments of this application, some task flows may include a logic control phase. In this case, a dialog box is displayed when the task flow is run for the user to perform a related operation. For example, the user activates a task card of "quickly sharing to WEIBO" in FIG. 4D, a function of the task card may be that a new photo is stored in a gallery (in other words, after a photo is taken by using a mobile phone), a dialog box is displayed for the user to perform quick editing (an atomic service in the logic control phase), and then the photo is automatically shared to WEIBO (namely, an action atomic service). As shown in FIG. 5A, after the electronic device detects a touch event of a finger 501 of the user for a camera app icon, in response to the touch event, the electronic device opens a related GUI of a camera app, obtains a photo in response to an operation of the user, and stores the photo in a gallery. The foregoing storage event triggers automatic running of a task flow corresponding to the foregoing task card. Therefore, the electronic device may display, on the touchscreen based on a logic control phase of the task flow, a dialog box shown in FIG. 5B. The dialog box is used by the user to perform simple and quick editing before the photo is shared to WEIBO. As shown in FIG. 5B, a photo 502 may be a latest photo taken by the user by using the electronic device, in other words, may be a latest picture stored in the gallery. A control 503 indicates that a currently logged-in WEIBO account is "Little Prince", and the user may share the photo by using this account. In some other embodiments of this application, the user may alternatively tap the control 503 to quickly exit from this account or log in to another WEIBO account in another GUI. An input box 504 is an interface for the user to edit a text, and a control 505 indicates that the user may cancel automatic sharing, to terminate current running of the task flow. A control 506 indicates that the user may share the photo to WEIBO after entering the text in the input box 504, or may share the photo to WEIBO without entering any text in the input box 504. Compared with that in the prior art, the technical solution in the foregoing embodiments does not require the user to perform a complex operation. Therefore, processing efficiency of the electronic device is improved, the electronic device is more intelligent, and user experience is also improved.

In some other embodiments of this application, a control 507 may be further displayed in FIG. 5B. The control 507 indicates that after in respond to the tap operation of the user, the task flow may be executed in the background without displaying a dialog box during next running. The tap operation may mean that the electronic device receives an input of the user and modifies the task flow, in other words, the atomic service in the logic control phase of the task flow is deleted.

Figure 6A:
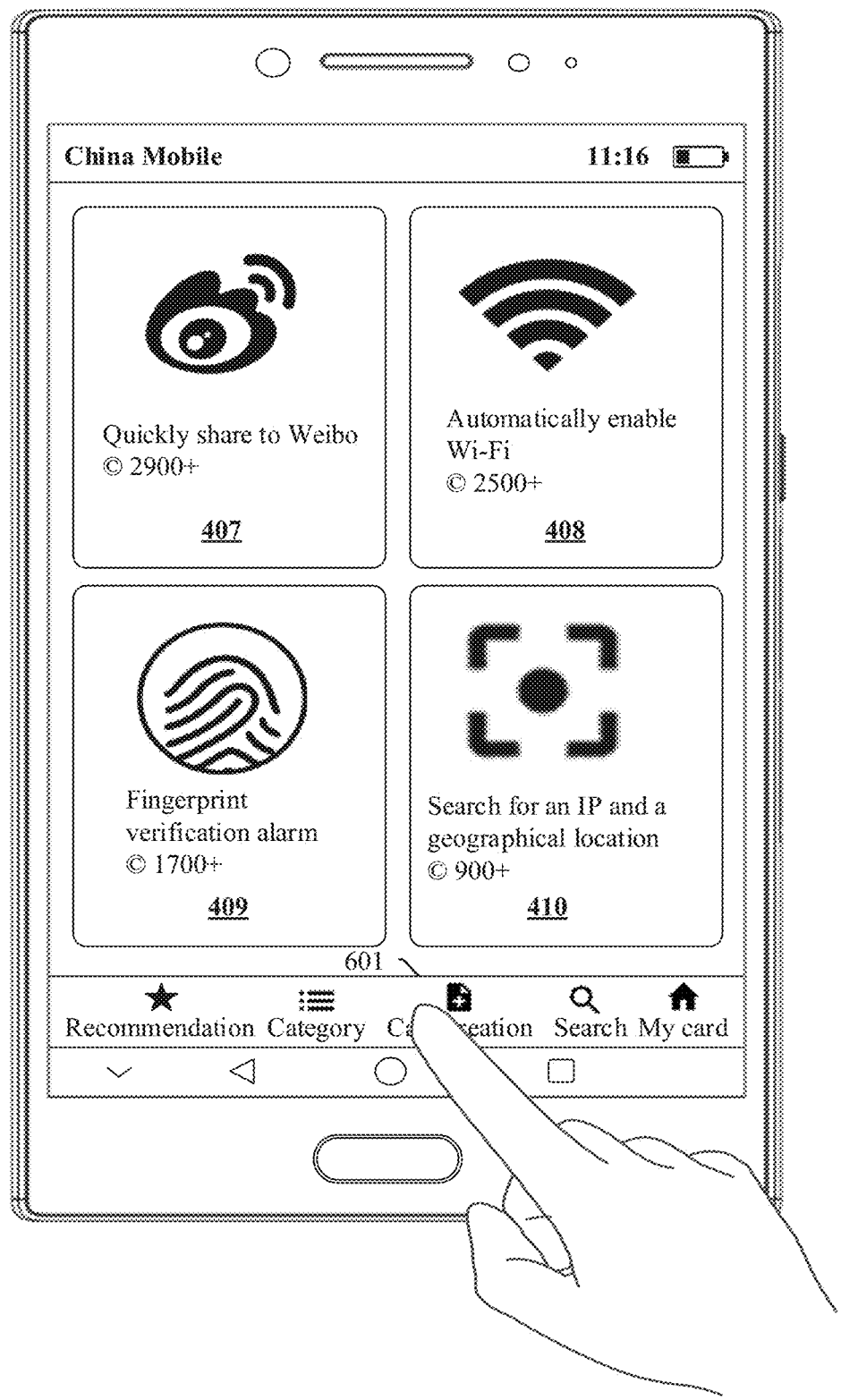
FIG. 6A to FIG. 6J are schematic diagrams of some other graphical user interfaces displayed on an electronic device according to some other embodiments.
Figure 6B:
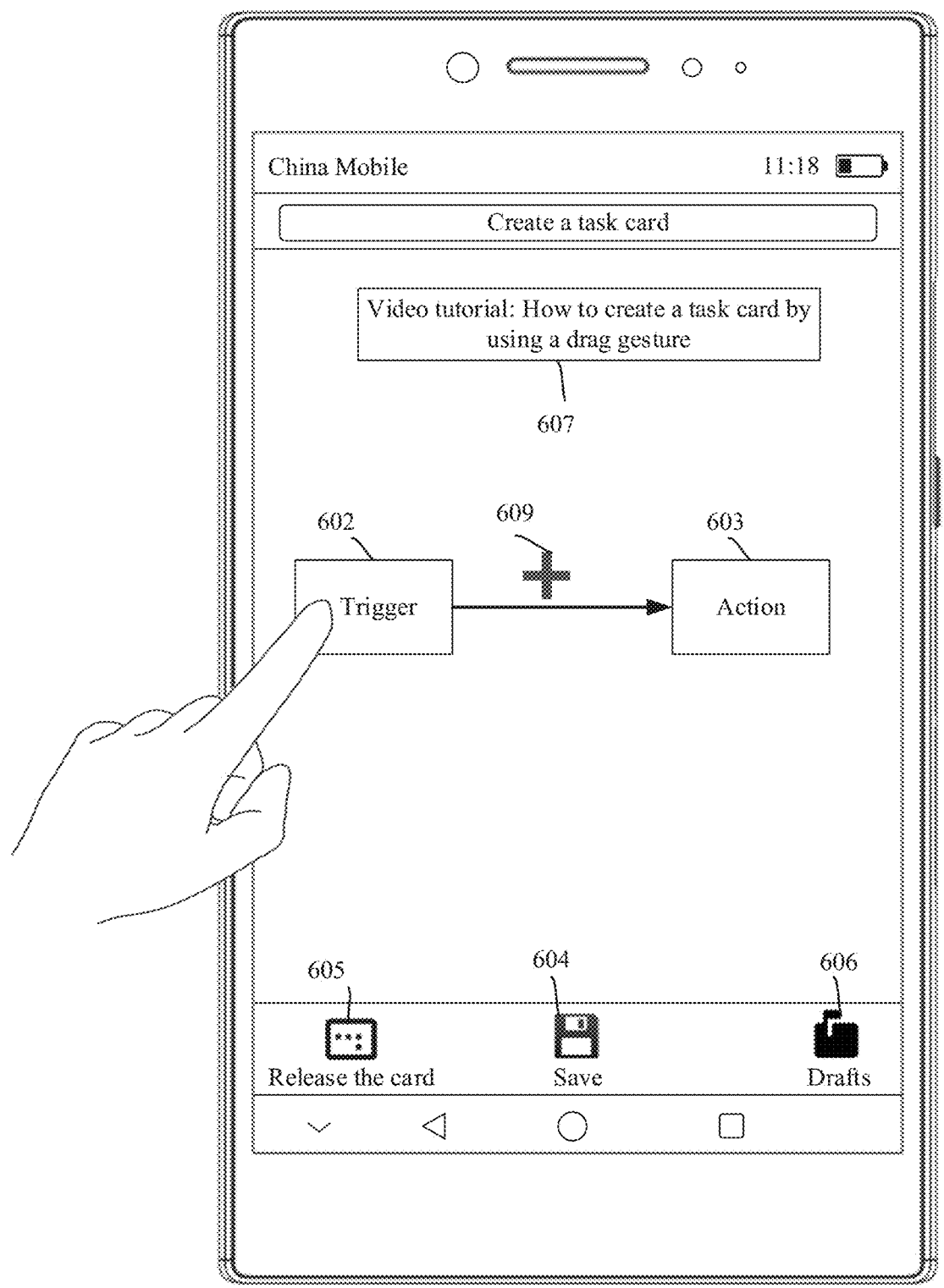

In some other embodiments of this application, the home screen of the task card store may further include a control configured to produce/create the task card, for example, a control 601 shown in FIG. 6A. For example, after the electronic device detects a touch event performed by the finger of the user for the control 601, in response to the touch event, a GUI shown in FIG. 6B is displayed on the touchscreen of the electronic device. A control 602, a control 603, and a control 607 are displayed in the GUI. The control 602 indicates a trigger phase of the task flow, and is configured to provide various trigger-type atomic services for the user to select after receiving an operation of the user. The control 603 indicates an action phase of the task flow, and is configured to provide various action-type atomic services for the user to select after receiving an operation of the user. The control 607 indicates prompt information for the user, and after receiving an operation of the user, the control 607 jumps to another interface in which there is a manual, a video, or the like on how to instruct the user to produce the task card by using a drag gesture. In some other embodiments of this application, FIG. 6B may further include a control 609. The control 609 is configured to add a logic control phase to a creation process of the task card in response to an operation of the user, to add an atomic service related to the task card in the logic control phase. In this way, content of the task card can be more abundant.

In some other embodiments of this application, a control 604, a control 605, and a control 606 may be further displayed in the GUI. The control 604 indicates that the user may store, on the electronic device at any time, a task card that has not been finished. The control 605 indicates that a task card that is finished by the user may be released to the task flow server by using the wireless network. The control 606 indicates that the user may view the task card that is stored on the electronic device and that has not been finished.

Figure 6C:
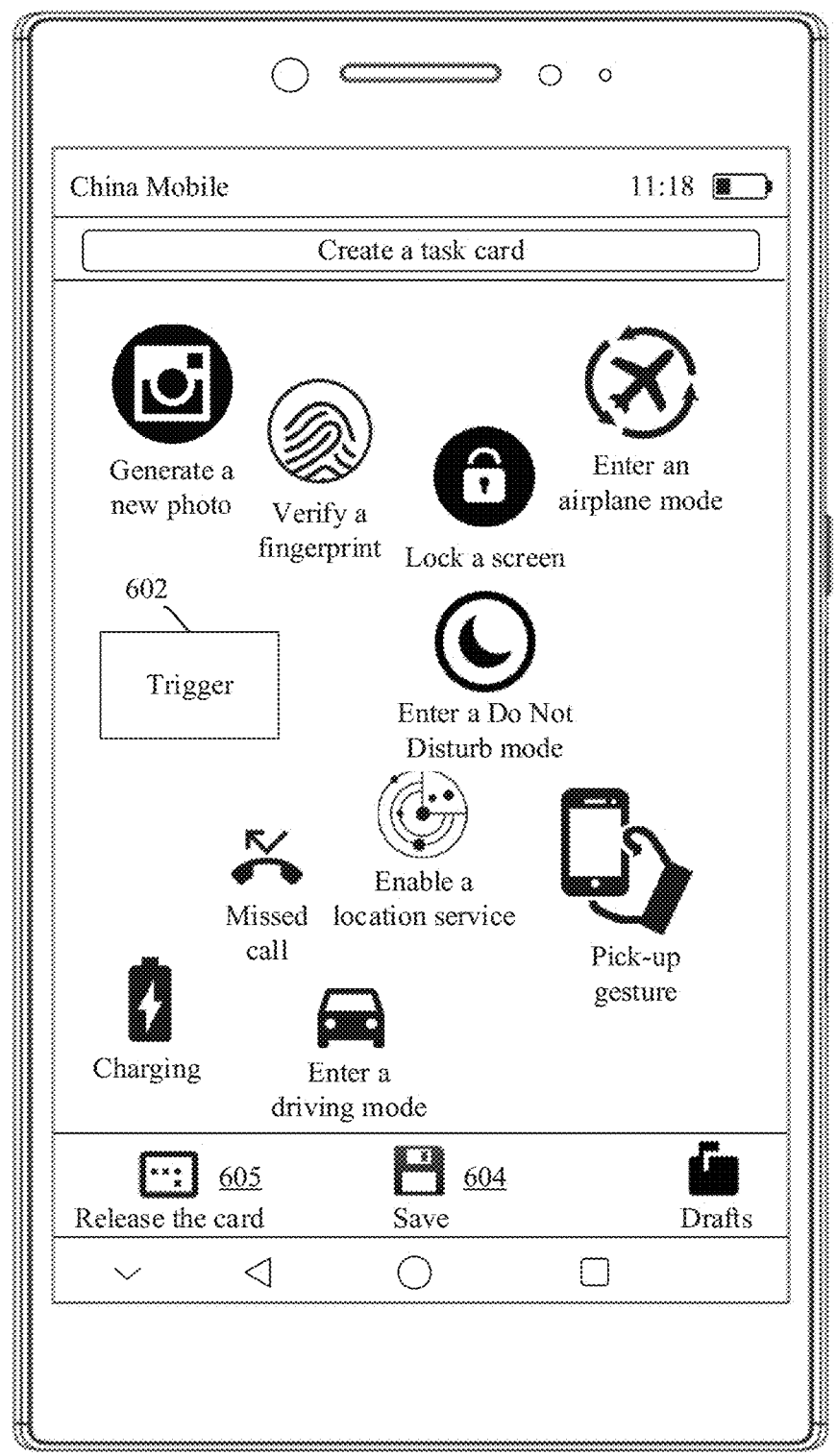

As shown in FIG. 6C, after the electronic device detects a touch event of the user for the control 602, in response to the touch event, the touchscreen of the electronic device displays trigger-type atomic service icons that can be selected by the user. Atomic services corresponding to these atomic service icons may be stored on the electronic device, or may be atomic services provided by the task flow server in the wireless network. In a GUI shown in FIG. 6C, a plurality of atomic services (namely, trigger-type atomic services) that can be used in the trigger phase are displayed. The displayed atomic service may be presented by using an icon, a text, an icon plus a text, or the like. To help the user to perform quick selection from the plurality of atomic services, the atomic services may be displayed on the touchscreen in a manner of an icon plus a text, as shown in FIG. 6C. Various atomic services shown in FIG. 6 C are described in Table 1 in the foregoing embodiment. Details are not described herein.

Figure 6D:
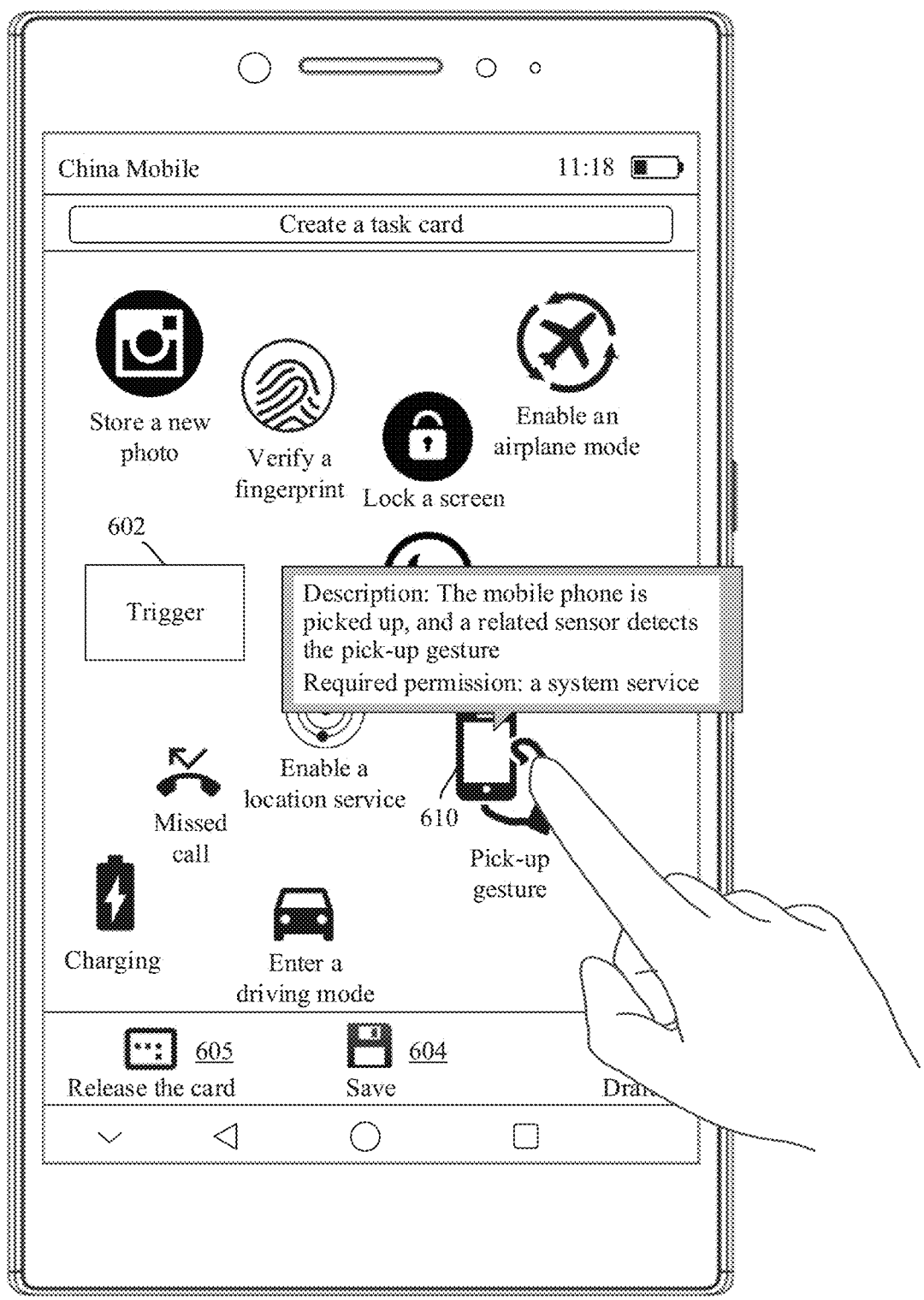

In some other embodiments of this application, to enable the user to more intuitively view basic information of an atomic service when a task card is created, as shown in FIG. 6D, after the electronic device detects a touch operation of the user for an atomic service icon 610, in response to the touch operation, a prompt box may be displayed on the touchscreen, and the prompt box displays basic information, for example, service description and required permission, of an atomic service corresponding to the atomic service icon 610. In some other embodiments of this application, when the prompt box is displayed on the touchscreen in response to the touch operation, other atomic services originally displayed on the touchscreen may be displayed in a fuzzy manner or not displayed. The GUI shown in FIG. 6C continues to be displayed on the touchscreen only after the finger of the user leaves the touchscreen. A person skilled in the art may understand that the touch operation may be a touch-and-hold gesture, a light-tap gesture, or a heavy-press gesture.

Figure 6E:
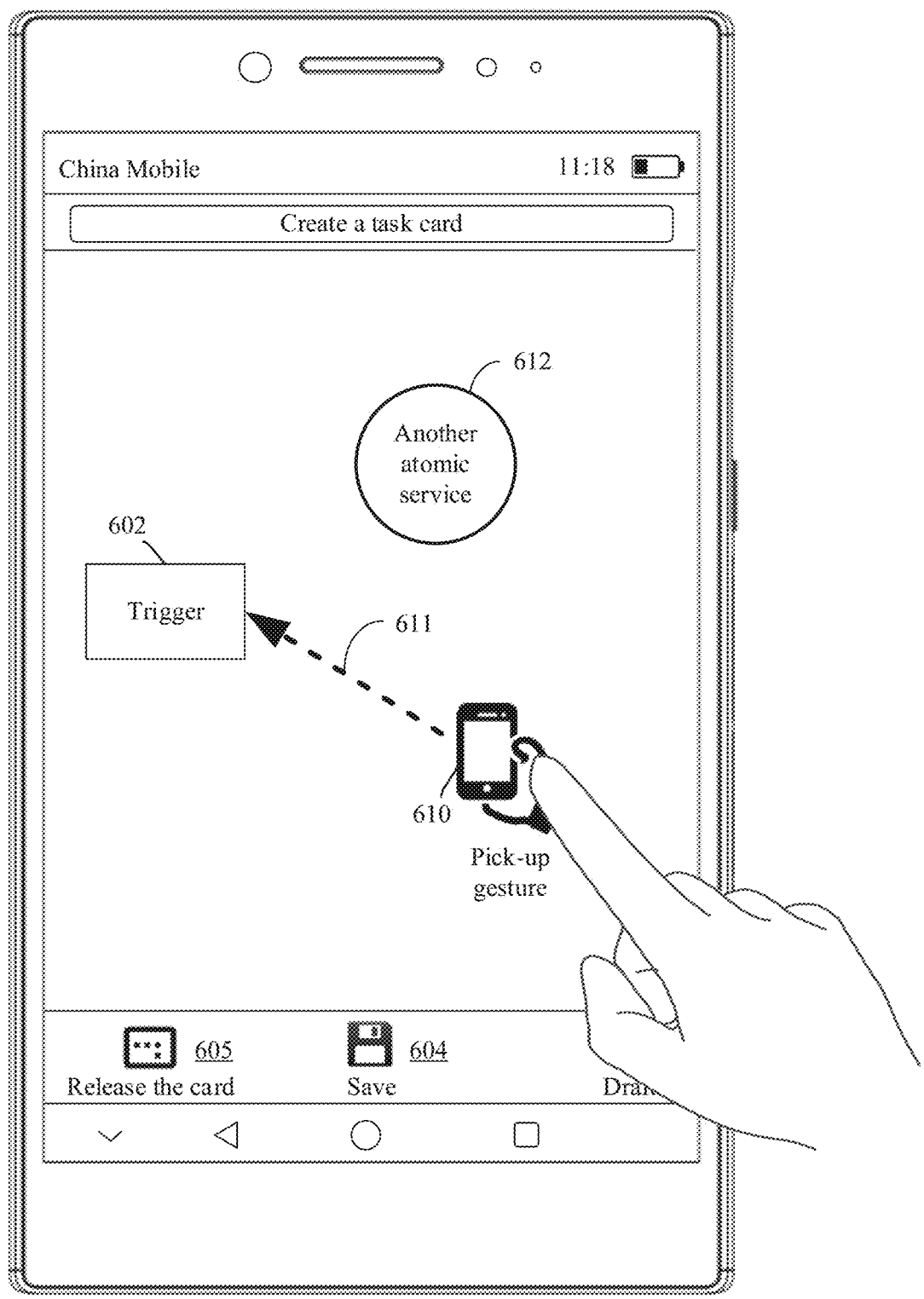
Figure 6F:
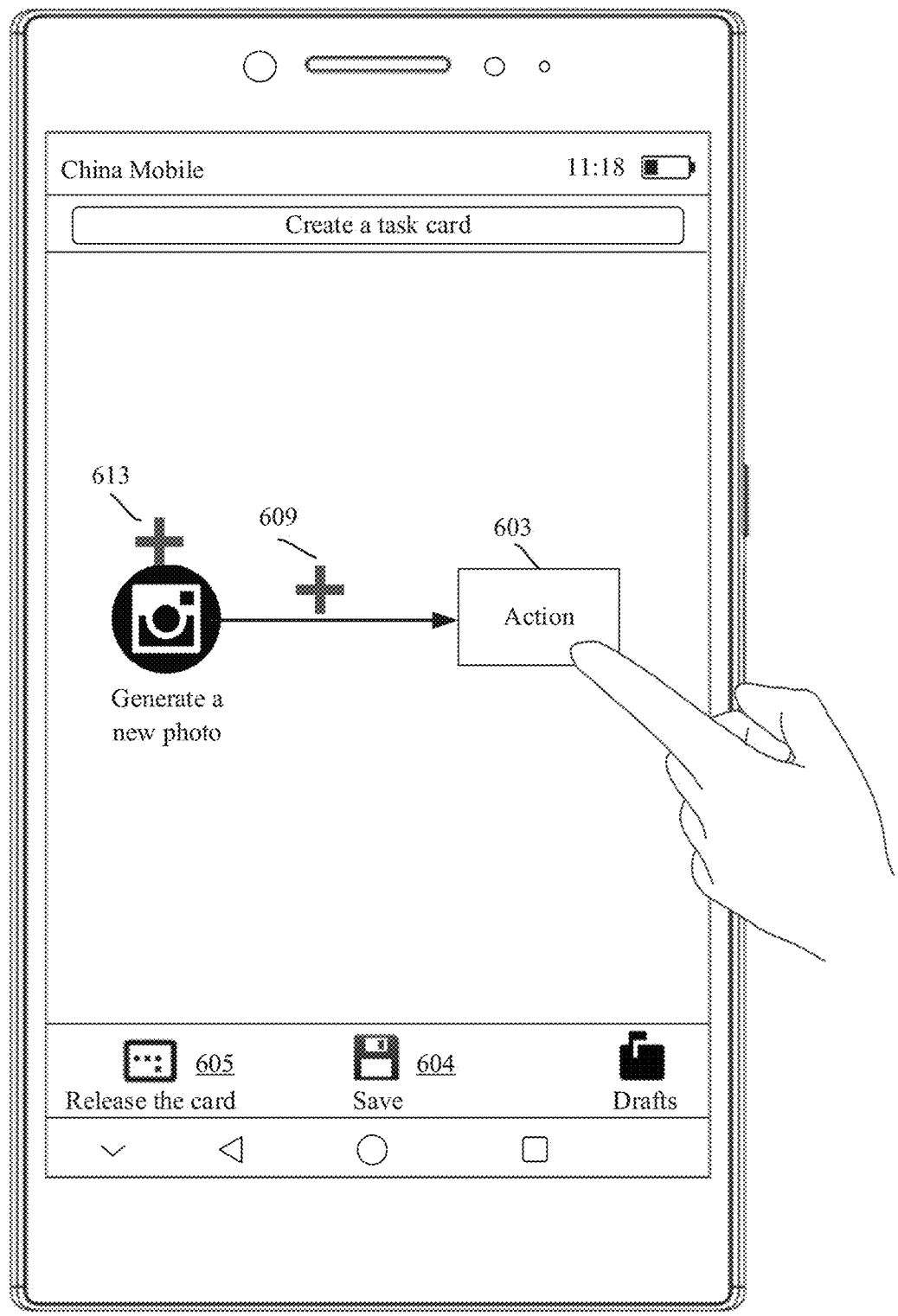

As shown in FIG. 6E, the electronic device detects a touch event (for example, the touch event may be a drag gesture 611) of the user for the atomic service icon 610. A function of the touch event is that the user selects the atomic service icon 610, and determines the atomic service corresponding to the atomic service icon 610 as an atomic service in the trigger phase of the task card. In response to the drag gesture 611, the atomic service icon 610 may be dragged to a location of the control 602 on the electronic device, and the atomic service icon 610 is displayed at this location. As shown in FIG. 6F, it indicates that the atomic service required in the trigger phase of the task card has been determined by the electronic device. In some other embodiments of this application, when the user performs the drag gesture 611 on the atomic service icon 610, other originally displayed atomic services may be dynamically scaled down, or even scaled down and gathered together. The electronic device may generate an icon 612. The icon 612 indicates a set of atomic services that are not selected by the user, thereby facilitating a user operation and improving user experience.

It may be understood that in some other embodiments of this application, there may be a plurality of atomic services in the trigger phase. The electronic device may determine, according to a time sequence in which atomic services are selected by the user, a running sequence of the plurality of atomic services in the trigger phase. For example, a control 613 may be further displayed in FIG. 6F. A function of the control is to receive an input of the user and add another atomic service in the trigger phase. In other words, the user may tap the control 613, and in response to the tap operation, the electronic device may display trigger-type atomic services on the touchscreen for the user to select another atomic service. The user may select another atomic service by using the same operation as that in FIG. 6D to FIG. 6E. After the selection is completed, the electronic device determines a second atomic service in the trigger phase. After the task card is finished, when a task flow corresponding to the task card is run, the two atomic services in the trigger phase can be executed according to a time sequence.

In some other embodiments of this application, the user may drag two or more than two atomic service icons at the same time, for example, drag a first atomic service icon and a second atomic service icon at the same time. The electronic device may determine, based on basic information of the two atomic services, which atomic service should be first run when the task flow is run. For example, the electronic device may determine that the first atomic service has an API of a system service, and the second atomic service has an API of a network service. In this case, the electronic device may determine that the first atomic service is run first. Because the API of the system service is located on the electronic device, the electronic device can easily first obtain related data by using the API. Then, the second atomic service may be run.

Figure 6G:
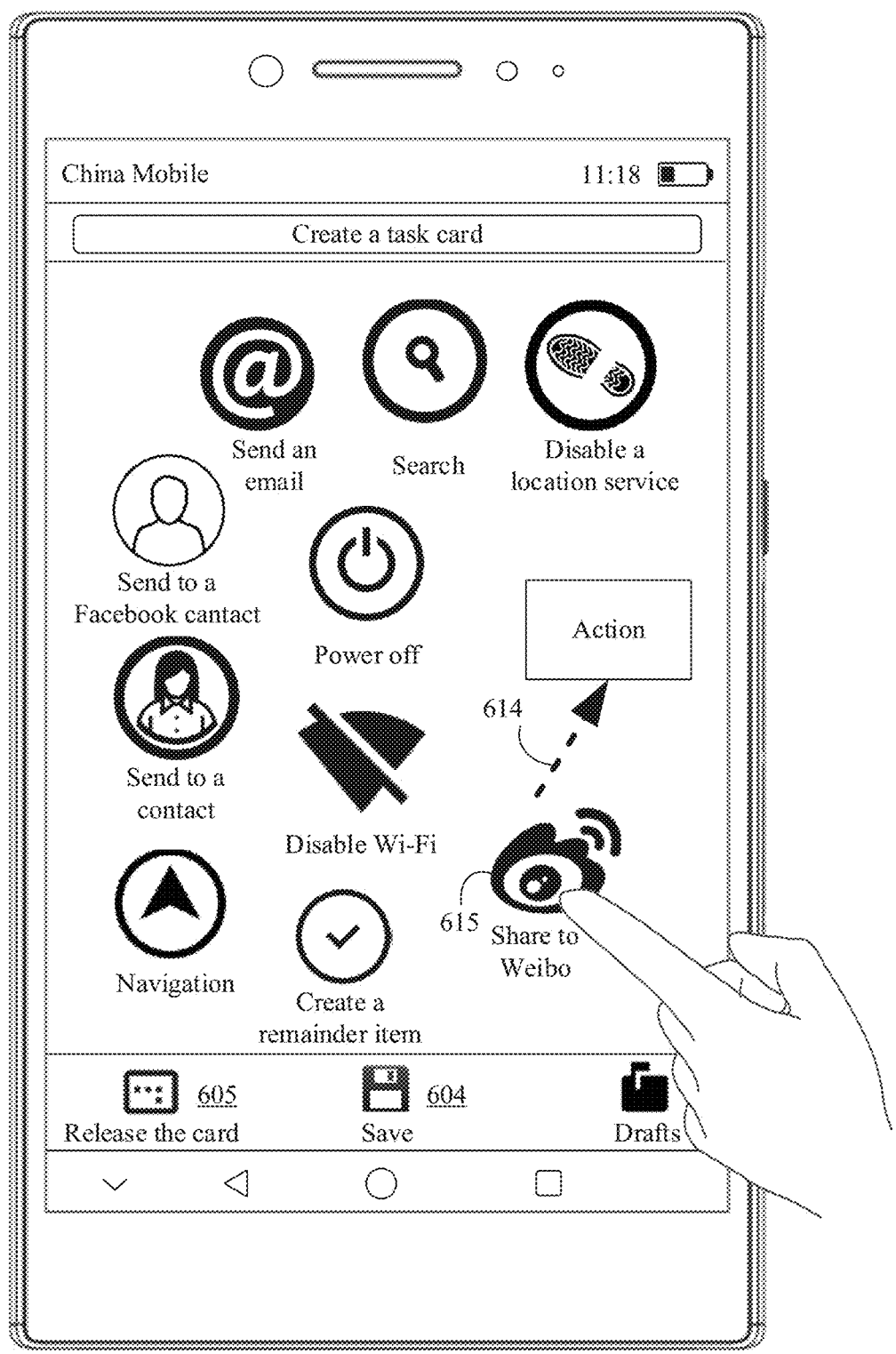
Figure 6H:
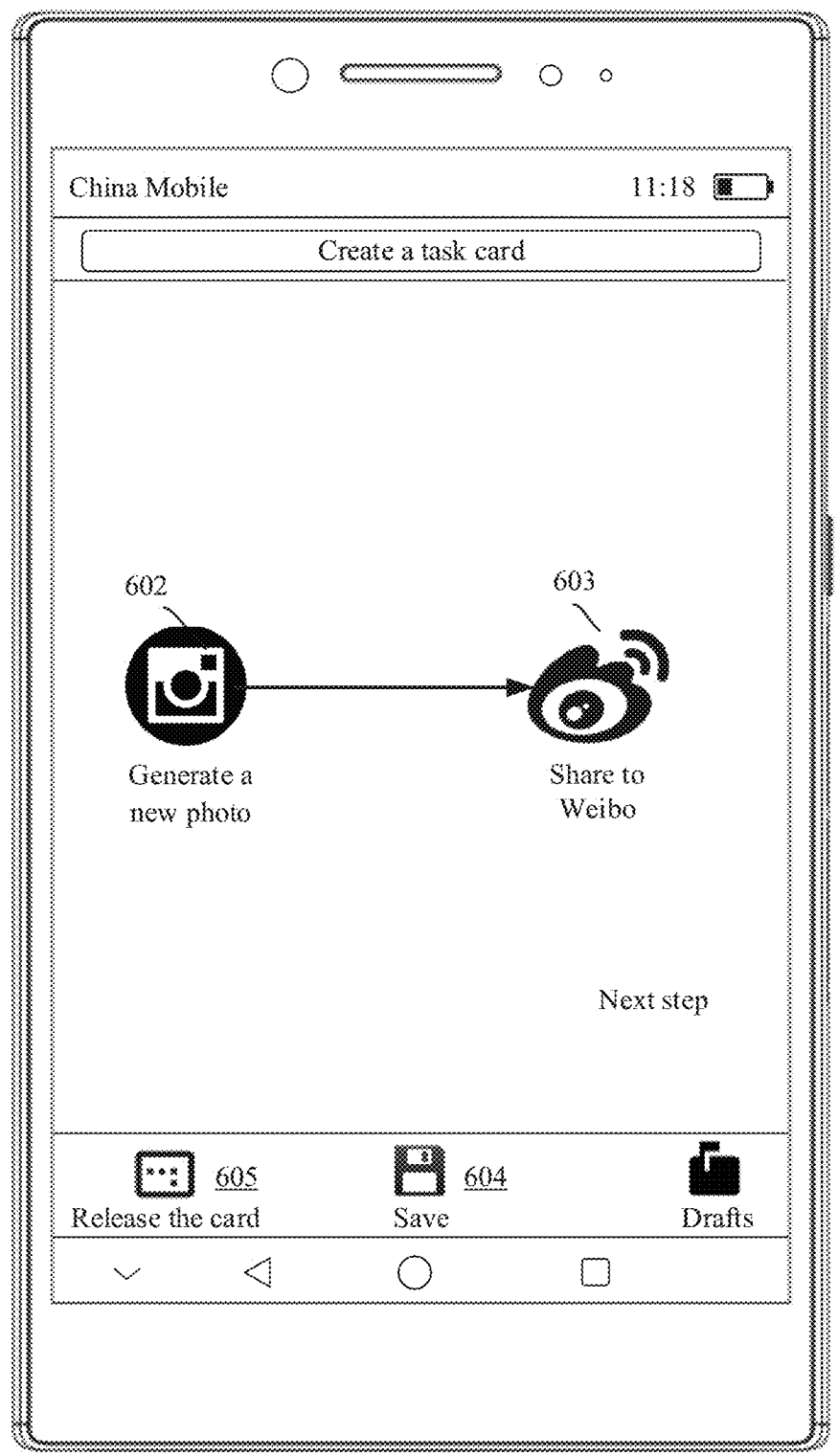
Figure 6I:
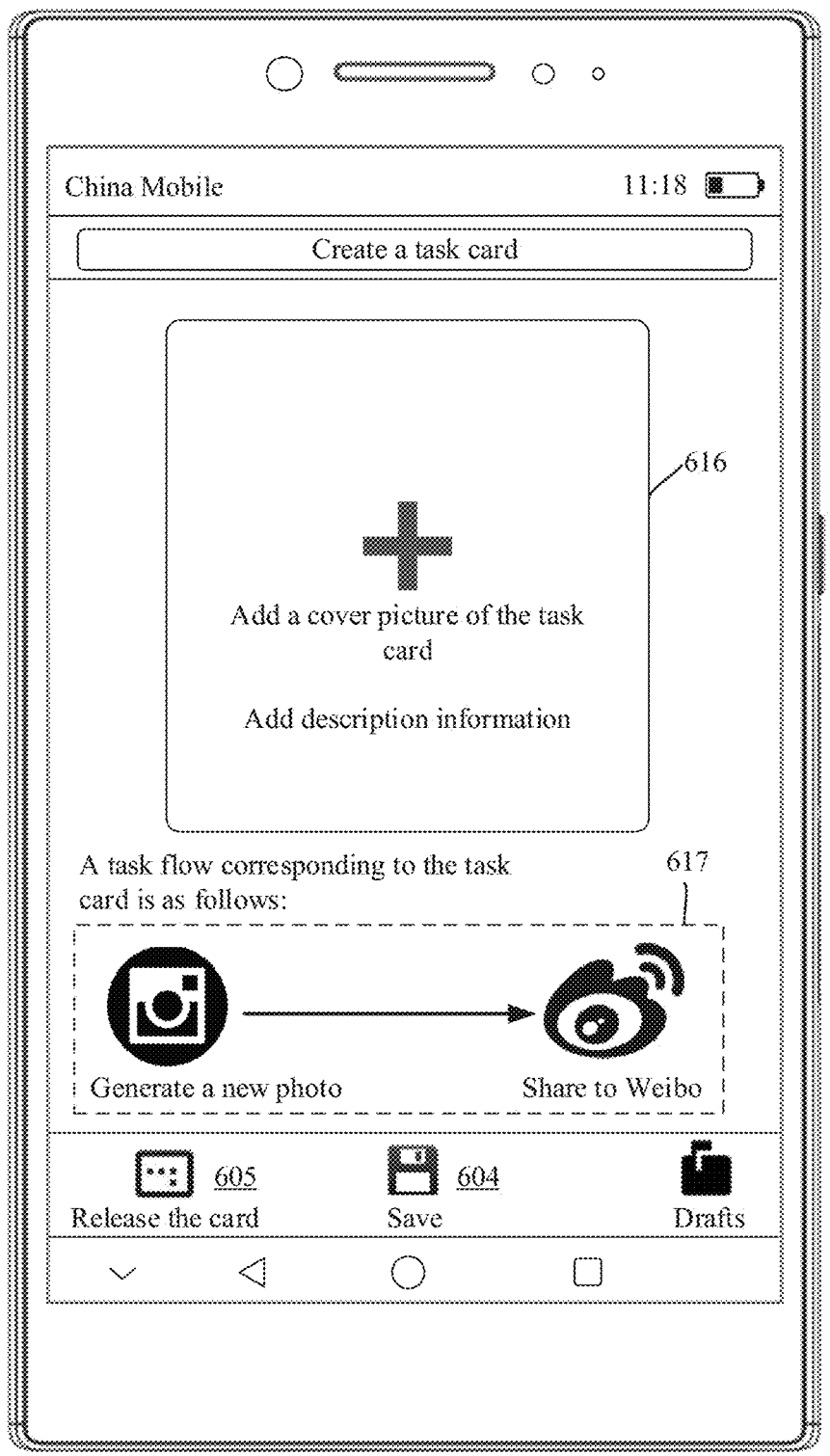

After the electronic device determines the atomic service in the trigger phase, a GUI shown in FIG. 6F may be displayed on the touchscreen. In this case, the user may select an atomic service in an action phase in a manner that is the same as or similar to that in the foregoing embodiment. For example, as shown in FIG. 6G, in response to a touch event of the user for the control 603, a plurality of action-type atomic service icons are displayed on the touchscreen, for example, atomic service icons such as an icon of search, an icon of disabling a location service, an icon of sending to a Facebook contact, an icon of disabling Wi-Fi, and an icon of sharing to WEIBO. For example, the electronic device detects a touch event (for example, the touch event may be a drag gesture 614) of the user for an atomic service icon 615. A function of the touch event is to select an atomic service corresponding to the atomic service icon 615, and determine the atomic service as an atomic service in the trigger phase of the task card. In response to the drag gesture 614, the atomic service icon 615 may be dragged to a location of the control 603 on the electronic device, and the atomic service icon 615 is displayed at this location. As shown in FIG. 6H, it indicates that the atomic service in the action phase of the task card has been determined by the electronic device. Therefore, one simple task flow that includes the trigger phase and the action phase is finished. Although the task flow is finished, a visualized task card corresponding to the task flow is not finished. In response to a touch event of the user for a control 620, the electronic device may display a GUI shown in FIG. 6I. In the GUI, a display area 616 is used by the user to edit a related picture of the task card and basic information related to the task card, for example, a developer name and usage/a function of the task card. A task card ID and a task flow ID may be automatically generated by the electronic device. A task flow corresponding to the task card is intuitively displayed in a display area 617. In this way, the user can confirm the basic information of the task flow again before releasing the task card.

In some other embodiments of this application, the user may perform, for example, a double-tap or long-press touch operation in the display area 617. In response to the touch operation, the electronic device may display, on the touchscreen again, a GUI on which the task flow is produced, for example, modify the atomic service in the trigger phase of the task flow (for example, replace the atomic service with another atomic service or add another atomic service), or for another example, modify the atomic service in the action phase of the task flow. This embodiment provides an approach to continuing to edit the task flow, so that the user can edit the task flow again before releasing the task card, thereby avoiding a problem that the user needs to return to the GUI in which the task flow is produced through frequent operations when the user is not satisfied with the task flow. This improves efficiency of producing the task card on the electronic device, and also improves user experience.

Figure 6J:
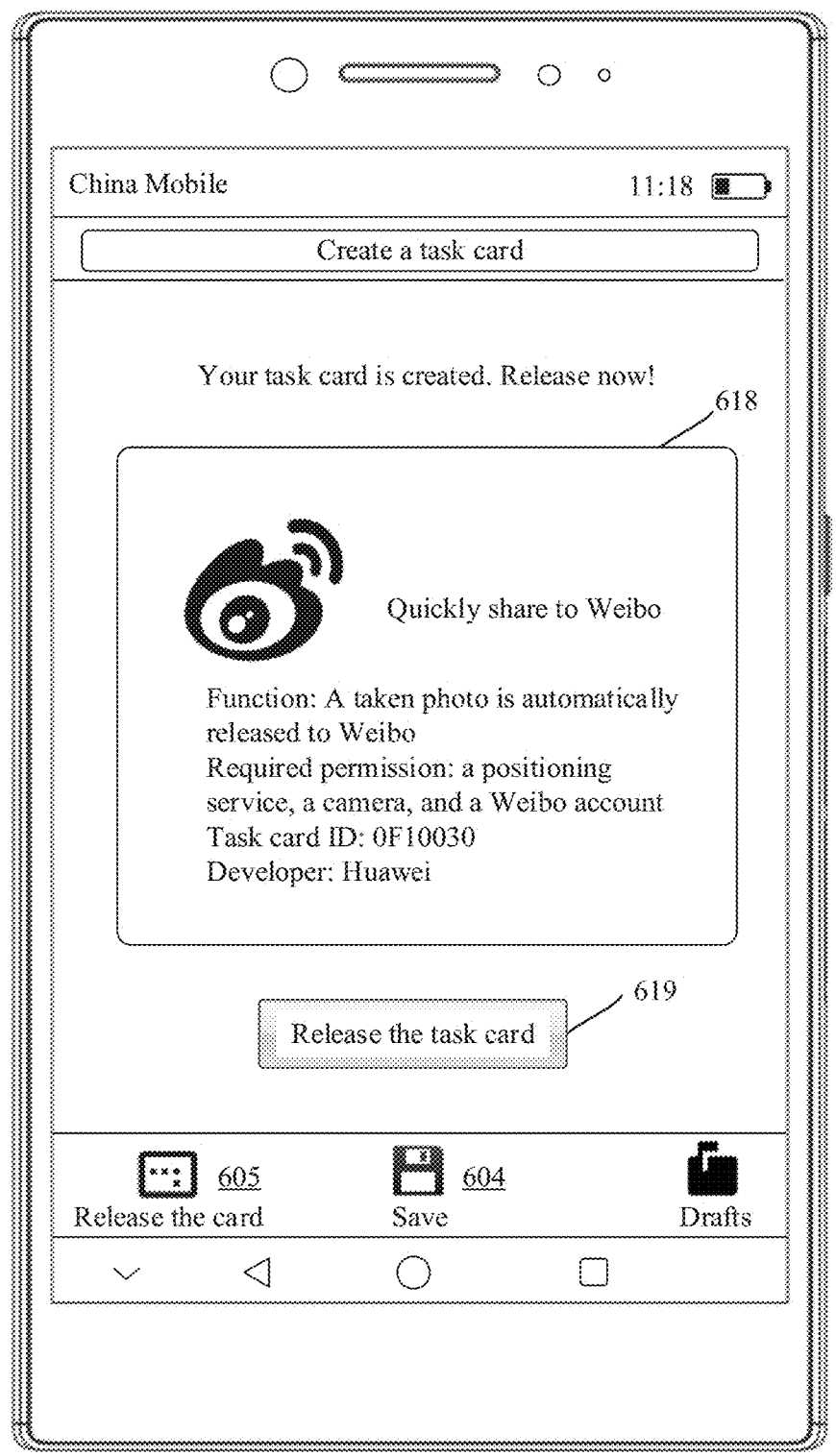

After the user adds the basic information related to the task card, in response to a touch event of the user, the electronic device may display a GUI shown in FIG. 6J on the touchscreen. In the GUI, basic information related to an edited task card is displayed, and a control 619 may be further displayed. The control 619 is configured to release the task card, so that another user can obtain the task card. With reference to FIG. 1, FIG. 2A, FIG. 2B, and the foregoing related embodiments, in response to a touch event (for example, a tap operation) of the user for the control 619, the electronic device may send the information related to the task card to the task flow server 200 in the network by using the wireless network. The task flow server 200 stores the information related to the task card sent by the electronic device, and may manage the task card and a task flow corresponding to the task card, for example, release the task card to the task card market, thereby facilitating obtaining of the task card by another user.

In some other embodiments of this application, a difference from that the task card is created by using the touch event such as dragging shown in FIG. 6B to FIG. 6H lies in that, the electronic device may alternatively display, by using a drop-down menu, all atomic services that can be used in the trigger phase or the action phase, so that the user selects a required atomic service by using a tap gesture or a mouse. In some other embodiments of this application, the electronic device may alternatively orchestrate the task card by using software such as an intelligent voice assistant installed on the electronic device, and the user does not need to drag the atomic service by using the finger. In this way, efficiency of using the electronic device can be further improved, and user experience is further improved. In some other embodiments of this application, the various atomic services displayed in FIG. 6C or FIG. 6G may be distinctively displayed based on a quantity of times of using each atomic service. For example, an atomic service that is most frequently used is displayed in a largest or brightest manner, thereby facilitating selection by the user.

In the foregoing embodiments of this application, when producing/creating the task card, the user first needs to determine the atomic service in the trigger phase. The atomic service in the action phase can be determined only after the atomic service in the trigger phase is determined. In this way, efficiency of producing the task card is improved.

It can be learned from the foregoing that, in the technical solution of producing the task card in the foregoing embodiments, executable programs with different functions can be orchestrated based on an atomic service by using a simple touch operation and a simple GUI, thereby greatly a shortening program editing time and improving efficiency of using the electronic device. In addition, because an orchestration interface of program orchestration is simple, easy-understanding, user-friendly, and visualized, each user can produce an original program (Taskflow) that belongs to the user. Therefore, the electronic device also improves user programming experience.

Figure 7A:
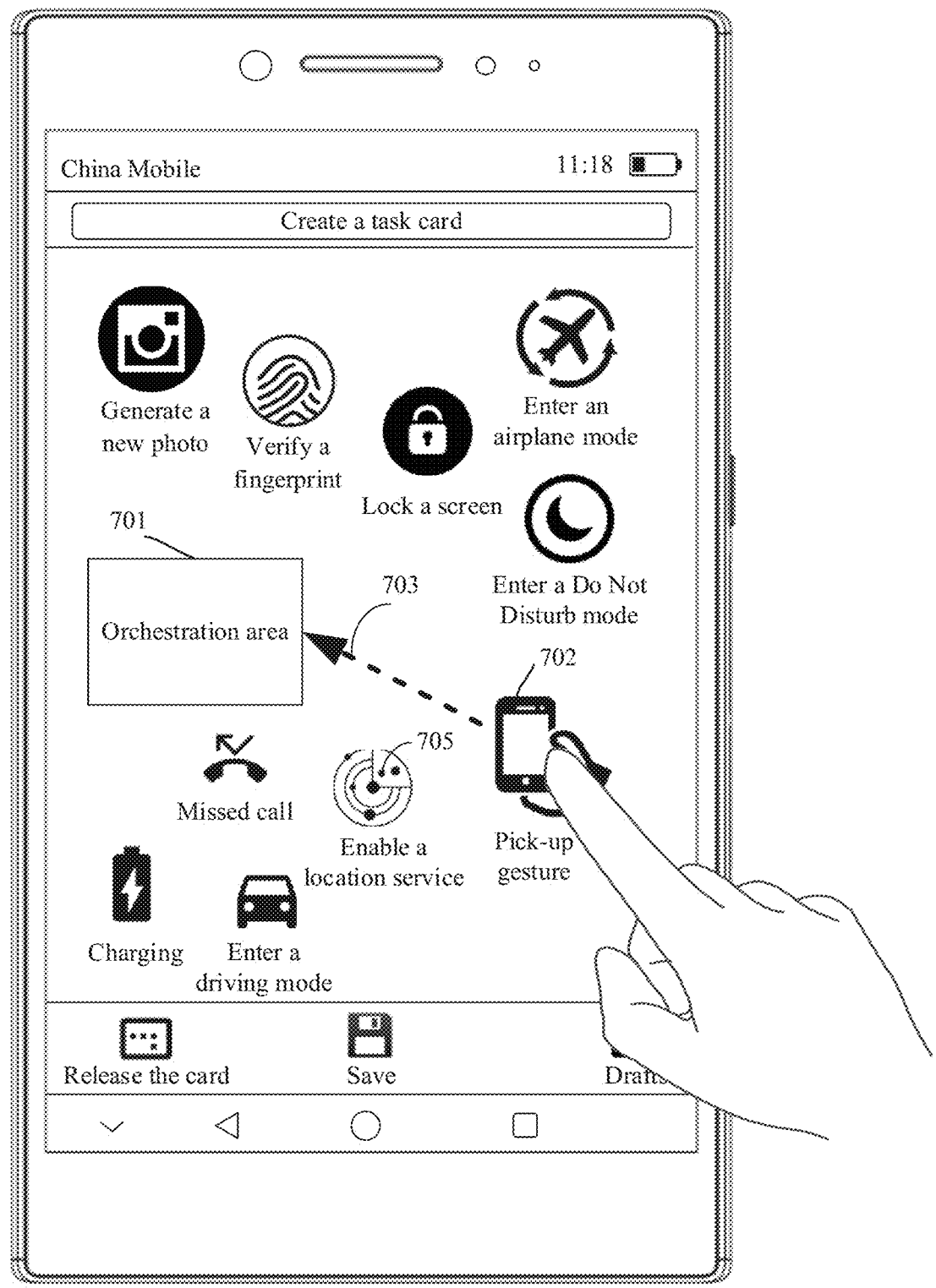
FIG. 7A to FIG. 7F are schematic diagrams of some other graphical user interfaces displayed on an electronic device according to some embodiments.

In some other embodiments of this application, as shown in FIG. 7A, when a user orchestrates a task flow, an electronic device displays a graphical user interface on a touchscreen, where there are a plurality of atomic service icons in the GUI, and each atomic service icon corresponds to one atomic service. An orchestration area 701 is further displayed in the GUI. The orchestration area 701 is used for accommodating atomic services selected by the user. The electronic device may orchestrate the atomic services in the orchestration area based on a program orchestration model, to generate an executable program. For example, as shown in FIG. 7A, the electronic device may detect a drag gesture 703 of the user for an atomic service icon 702. A function of the drag gesture 703 is to drag the atomic service icon 702 to the orchestration area 701. In response to the drag gesture 703, the electronic device determines that a first atomic service selected by the user is an atomic service corresponding to the atomic service icon 702, namely, a pick-up gesture.

Figure 7B:
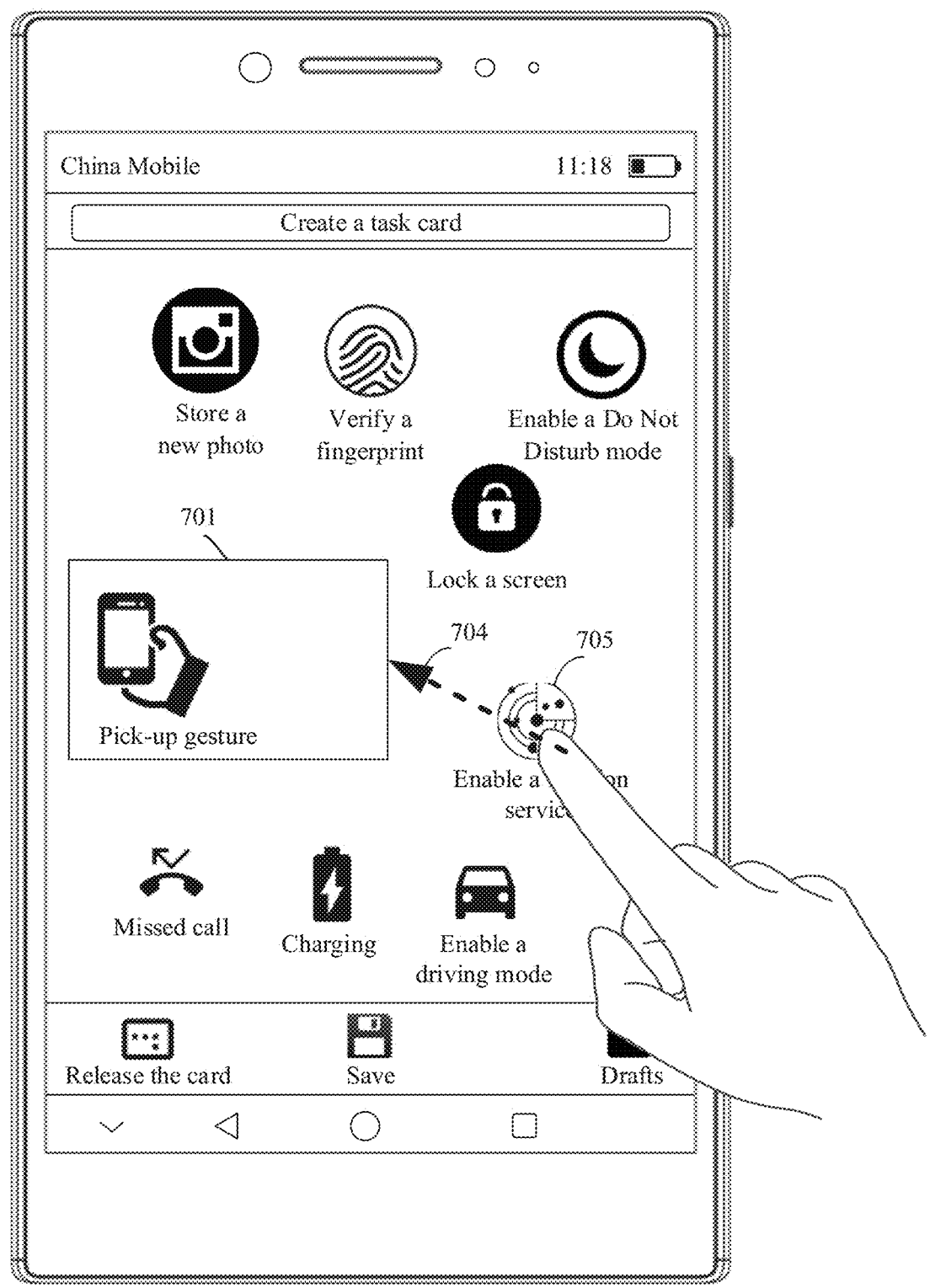

In FIG. 7B, the electronic device may detect a drag gesture 704 of the user for an atomic service icon 705. A function of the drag gesture 704 is to drag the atomic service icon 705 to the orchestration area 701. In response to the drag gesture 704, the electronic device determines that a second atomic service selected by the user is a second atomic service corresponding to the atomic service icon 705, for example, enabling a location service. After two atomic service icons are displayed in the orchestration area 701, a control 706 is displayed in the GUI. The control 706 is configured to receive an input (for example, a tap) of the user, and the electronic device determines, based on the program orchestration model and the atomic service in the orchestration area 701, how to orchestrate and generate a new executable program, namely, a task flow.

Figure 7C:
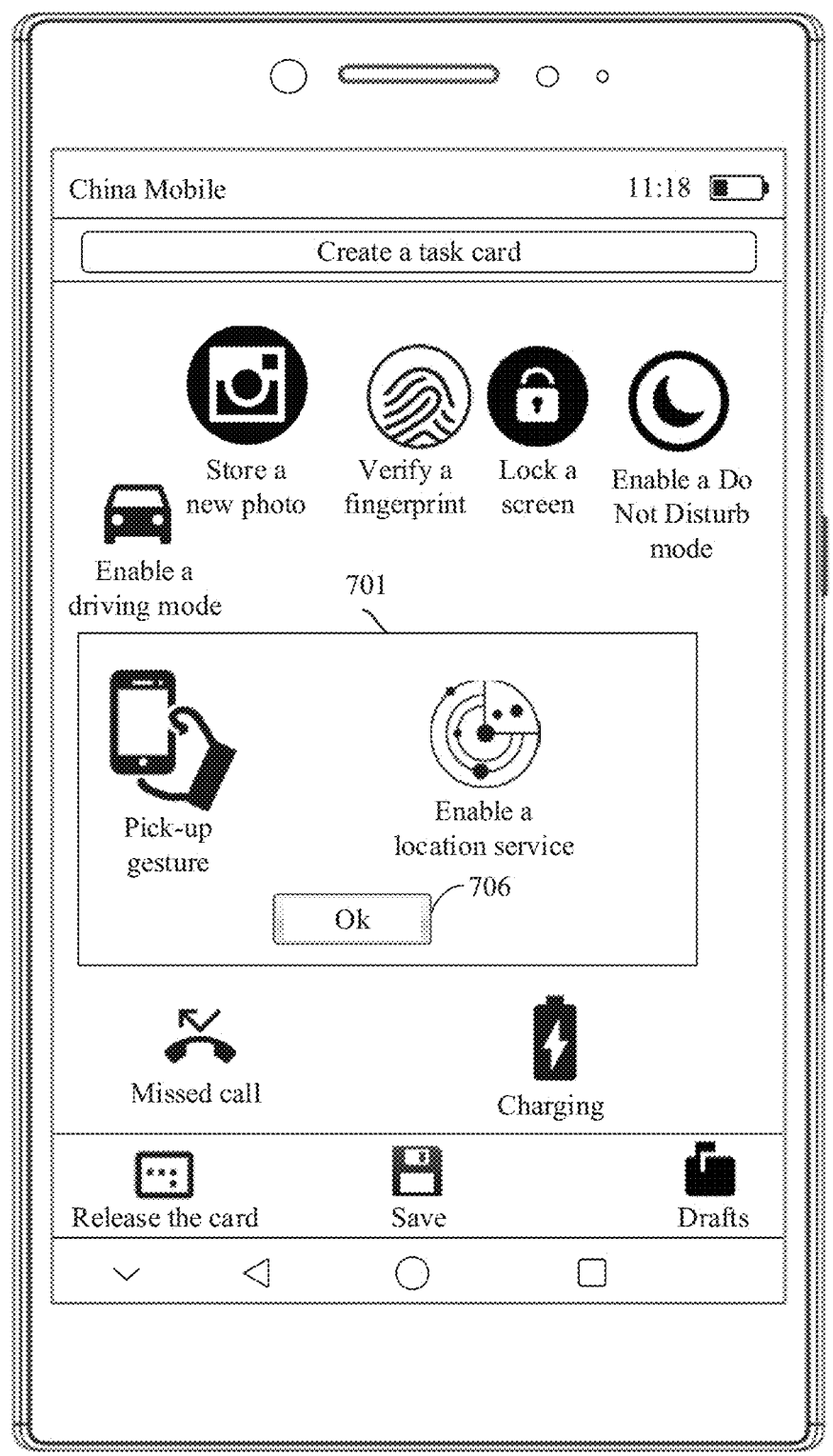
Figure 7D:
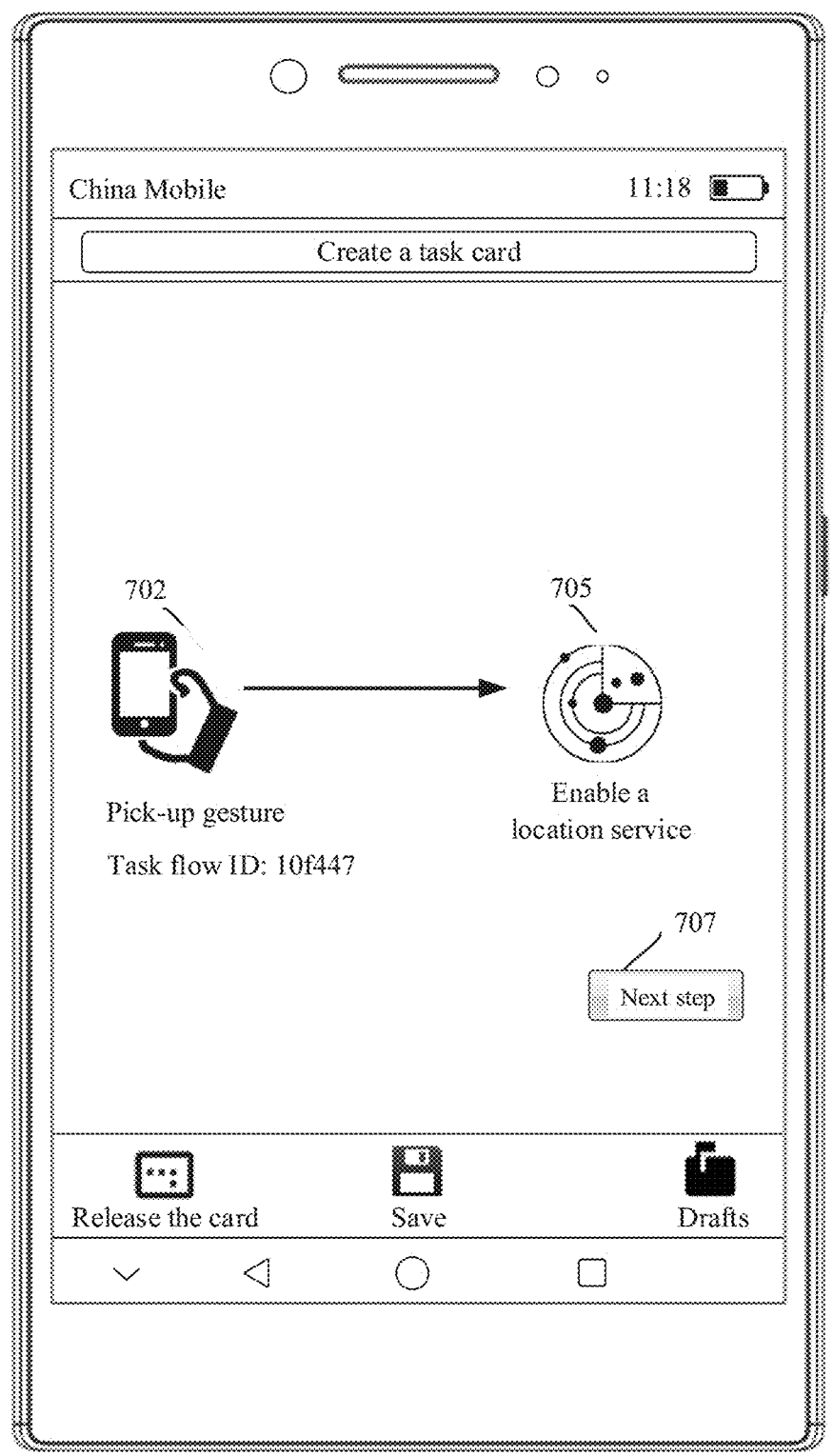
Figure 7E:
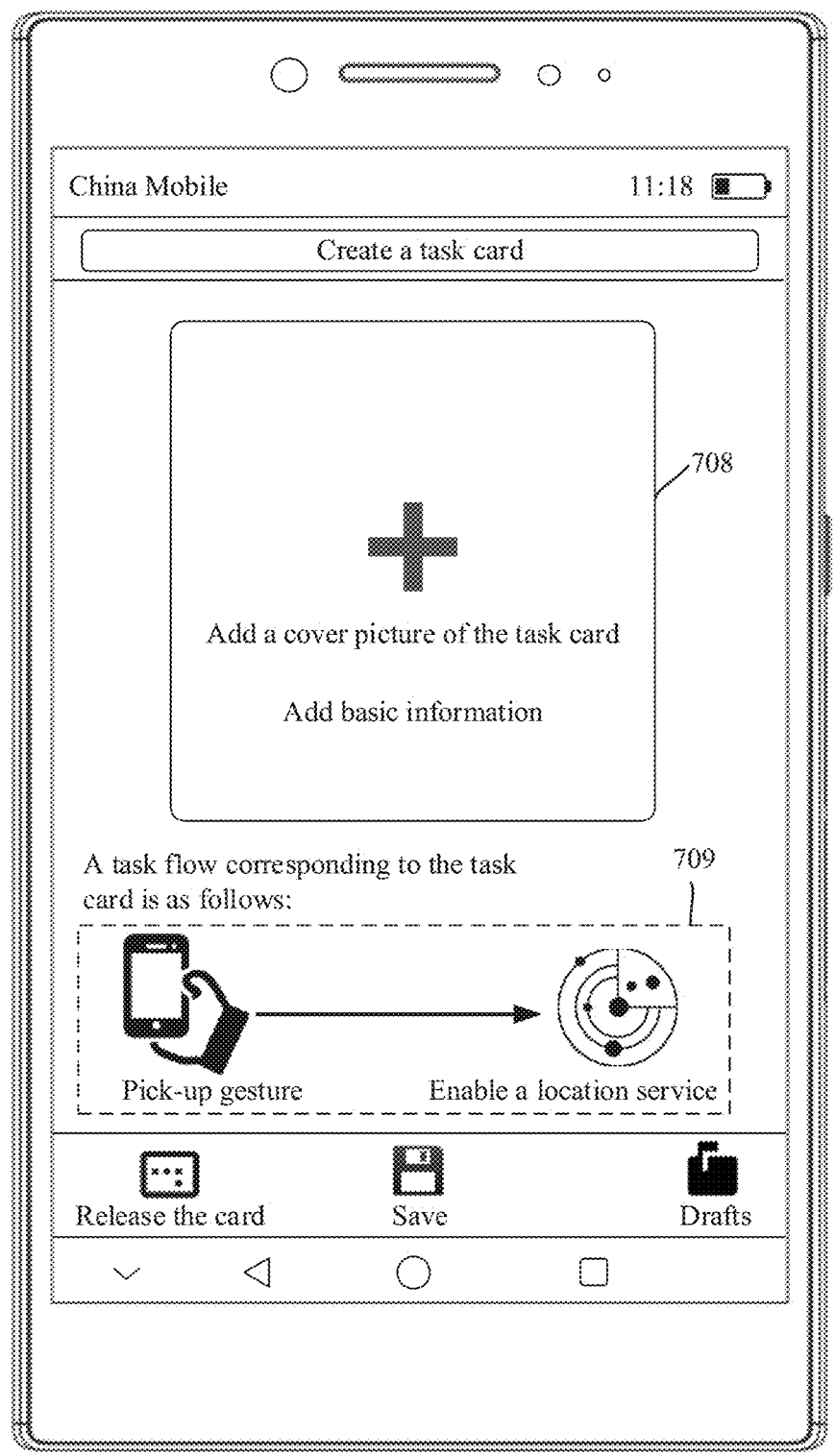
Figure 7F:
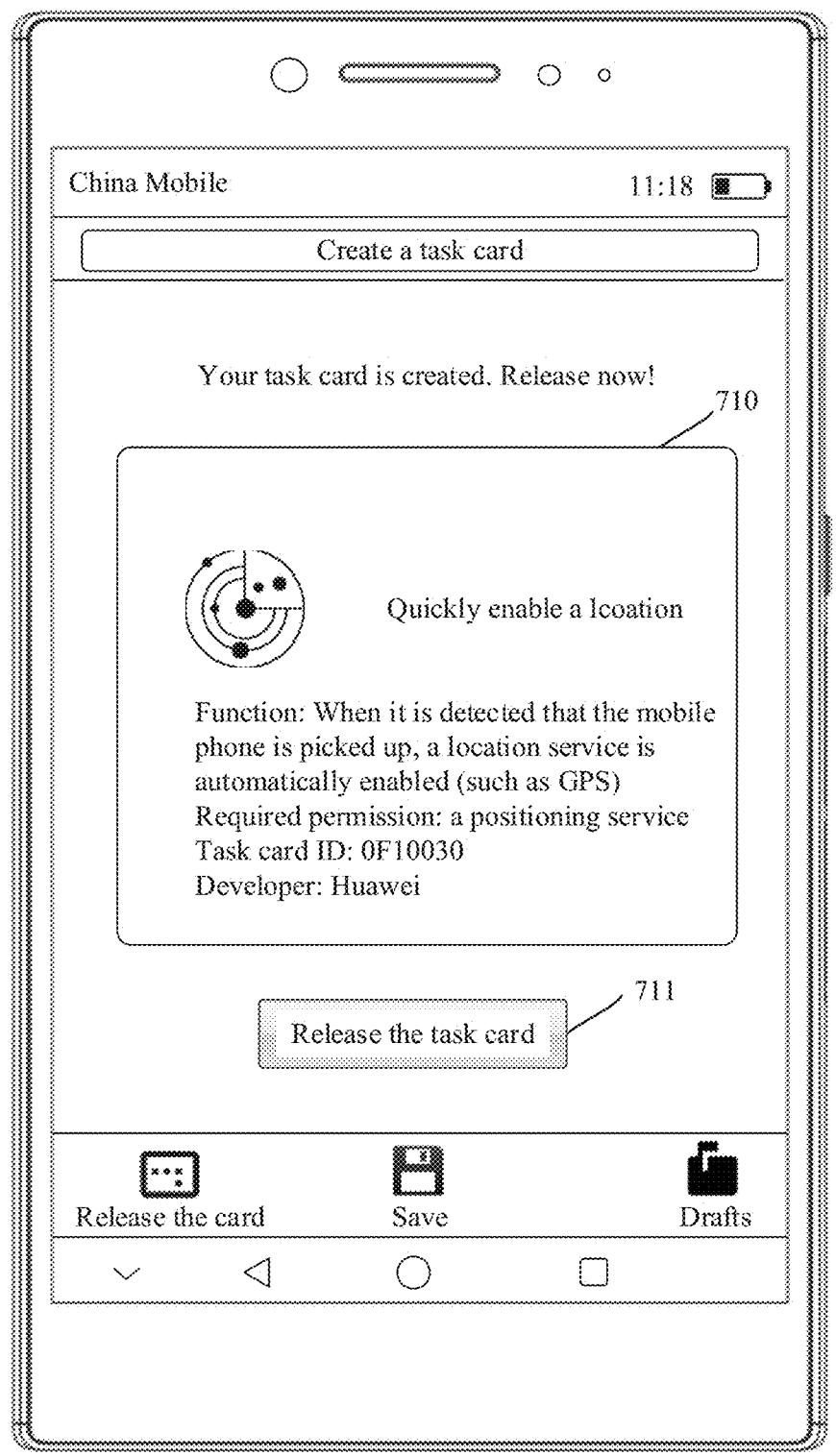

Generally, at least two atomic services are required for the electronic device to generate an executable task flow. Therefore, in the orchestration area 701, there are two or more than two atomic service icons. The electronic device may determine basic information of the atomic service in the orchestration area 701, for example, a type and a service ID. Then, the electronic device orchestrates, based on a stored program orchestration model, the first atomic service corresponding to the first atomic service icon and the second atomic service corresponding to the second atomic service icon. The electronic device may store various program orchestration models. A program framework of the task flow has been built in the model, and a new executable program can be generated provided that a determined atomic service is written into the model. For example, in FIG. 7C, there are two atomic services selected by the user in the orchestration area: a pick-up gesture and enabling a location service. In this case, the electronic device may generate the following task flow: When detecting the pick-up gesture (in other words, a mobile phone is picked up by a hand of the user), the electronic device enables the location service. The electronic device detects a touch event (for example, a tap) of the user for a control 707, and displays a GUI shown in FIG. 7E on the touchscreen. This GUI indicates that the task flow is completed, and information related to the task card needs to be added in a display area 708. After the information is added, the electronic device displays a GUI shown in FIG. 7F, and basic information related to the task card is described in a display area 710. After the user taps a control 711, the task card and a task flow corresponding to the task card are uploaded to a task flow server 200 in a wireless network. The task flow server 200 releases received information of the task card to a service open platform, so that another user can download the task card from a task card store on another electronic device.

In the embodiments shown in FIG. 7A to FIG. 7F, the user does not need to consider which atomic service is a trigger-type atomic service and which atomic service is an action-type atomic service. The electronic device can automatically confirm and generate a corresponding task flow only after the user drags a selected atomic service to the orchestration area.

In some other embodiments of this application, if there are more than two selected atomic services in the orchestration area, the electronic device may generate two or more than two different task flows, because these atomic services may have two or more than two orchestration manners, in other words, two or more than two program orchestration models correspond to the selected atomic services. In this case, after the user taps the control 706, the electronic device may display the two or more than two task flows on the touchscreen, to prompt the user to perform selection. The user can select to generate all the task flows or can select to generate only one of the task flows.

Figure 8:
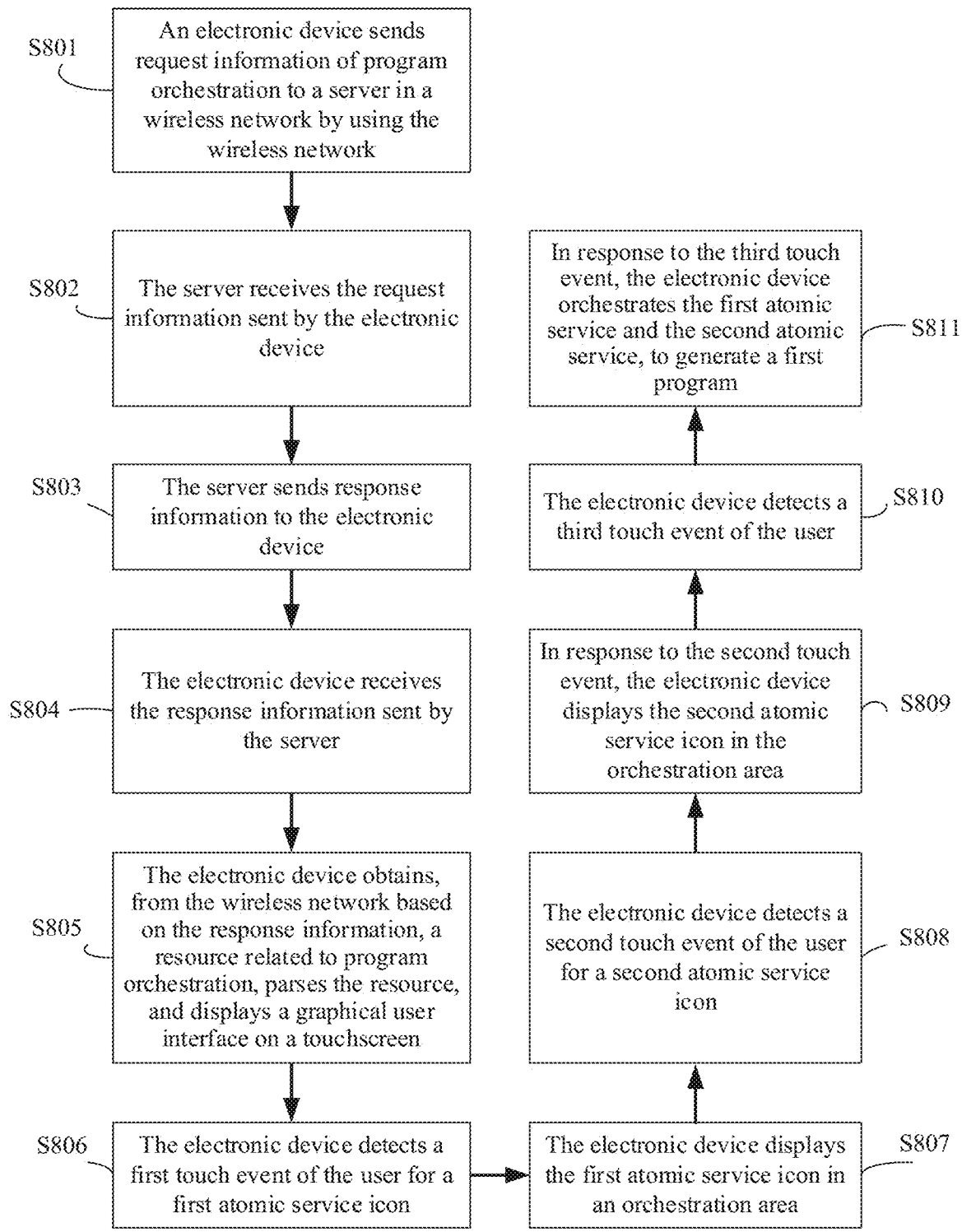
FIG. 8 is a schematic flowchart of a method according to some embodiments.

As shown in FIG. 8, an embodiment of this application provides a program orchestration method. The method may be implemented by the network system in FIG. 1. The method may specifically include the following steps.

Step S801: An electronic device sends request information of program orchestration to a server in a wireless network by using the wireless network.

For example, the electronic device may be the electronic device 100 in FIG. 1, and the server may be the task flow server 200 in FIG. 1. The request information may be triggered by a user. For example, in FIG. 6A, the finger of the user taps the control on the touchscreen, and in response to the tap operation, the electronic device sends the request information of program orchestration to the task flow server 200 by using the wireless network. The request information may include an identifier of the electronic device, and the identifier is used for uniquely identifying the electronic device, so that the server sends related information to the electronic device. The identifier of the electronic device may be a universally unique identifier (universally unique identifier, UUID), where the UUID is a number generated on an electronic device, and it is ensured that the UUID is unique to all electronic devices. The identifier of the electronic device may alternatively be an international mobile equipment identity (international mobile equipment identity, IMEI), or may be a mobile equipment identifier (mobile equipment identifier, MEID). It may be understood that the identifier of the electronic device in this application is not limited to the foregoing examples, and may further include another type. This is not limited in this specification.

For example, in the HTTP protocol, the electronic device may send, to the server based on a GET method or a POST method, request information of obtaining a resource used for program orchestration. In some other embodiments of this application, the electronic device may alternatively add the request information to another type of message, to send the request information to the server.

Step S802: The server receives the request information sent by the electronic device.

Step S803: In response to the request information, the server sends response information to the electronic device. For example, the response information may include a web address of a resource required for program orchestration.

Step S804: The electronic device receives the response information sent by the server.

Step S805: The electronic device obtains, from the wireless network based on the response information, a resource related to program orchestration, parses the resource, and displays a graphical user interface on the touchscreen. At least one atomic service icon is displayed in the GUI, each atomic service icon corresponds to one atomic service, and the atomic service may provide a service capability in an API manner. More meanings of the atomic service are described in the foregoing embodiments. Details are not described herein.

An orchestration area is further displayed in the GUI, where the orchestration area is used for accommodating atomic service icons selected by the user. For example, the orchestration area may be an area in which the controls 602, 603, and 609 in FIG. 6B are located, or may be an area shown in FIG. 7A. In this step, after detecting an input of the user, the electronic device may display the GUI shown in FIG. 6B or FIG. 7A on the touchscreen.

Step S806: The electronic device detects a first touch event of the user for a first atomic service icon. For example, the first atomic service icon may be the atomic service icon 610 shown in FIG. 6D, or may be the atomic service icon 702 shown in FIG. 7A.

Step S807: In response to the first touch event, the electronic device displays the first atomic service icon in the orchestration area. The first touch event may be a drag gesture for the first atomic service icon, in other words, a finger of the user performs a touch-and-hold operation on the first atomic service icon, and then the finger moves from a location of the first atomic service icon on the touchscreen to a location of the orchestration area. It may be understood that a specific form of the first touch event is not limited to the foregoing listed case.

Step S808: The electronic device detects a second touch event of the user for a second atomic service icon, where the second atomic service icon corresponds to a second atomic service. For example, the first atomic service icon may be the atomic service icon 615 shown in FIG. 6F, or may be the atomic service icon 705 shown in FIG. 7A.

Step S809: In response to the second touch event, the electronic device displays the second atomic service icon in the orchestration area. The second touch event may be a drag gesture for the second atomic service icon, in other words, a finger of the user performs a touch-and-hold operation on the second atomic service icon, and then the finger moves from a location of the second atomic service icon on the touchscreen to the location of the orchestration area. It may be understood that a specific form of the second touch event is not limited to the foregoing listed case.

Step S810: The electronic device detects a third touch event of the user.

Step S811: In response to the third touch event, the electronic device orchestrates the first atomic service and the second atomic service, to generate a first program.

The third touch event may be a tap gesture, in other words, a finger of the user performs a tap operation on a control displayed on the touchscreen. Because the first atomic service icon and the second atomic service icon are displayed in the orchestration area, the electronic device may determine that the user needs to orchestrate a first atomic service corresponding to the first atomic service icon and the second atomic service corresponding to the second atomic service icon that are in the orchestration area.

That the electronic device orchestrates the first atomic service and the second atomic service, to generate a first program may specifically include: orchestrating, by the electronic device based on a stored program orchestration model, the first atomic service corresponding to the first atomic service icon and the second atomic service corresponding to the second atomic service icon. The electronic device may store various program orchestration models. A program framework of a task flow has been built in the model, and a new executable program can be generated provided that a determined atomic service is written into the model. The first program may be understood as the task flow in the foregoing embodiment, and the first program includes code of the first atomic service and code of the second atomic service.

In some embodiments of this application, the first atomic service may provide a service capability by using a local API of the electronic device, and the second atomic service may provide a service capability by using an API of a network. For example, the system service interface is an interface used for obtaining a new photo, and the network service interface is an interface used for obtaining a WEIBO service. For another example, the first atomic service may be a system service of the electronic device, for example, enabling an airplane mode or detecting a pick-up gesture. These system services can be invoked without participation of a server in the wireless network. The second atomic service may be a network service, for example, sharing to WEIBO. The second atomic service needs participation of the server in the wireless network, for example, a server of a WEIBO application, in other words, needs to invoke a related network interface of WEIBO.

In some other embodiments of this application, the method may further include the following steps.

Step S812: The electronic device detects an input of the user.

Step S813: In response to the input of the user, the electronic device sends release request information to the server in the wireless network, where the release request information includes the identifier of the first program obtained through orchestration and the identifier of the electronic device.

Step S814: The electronic device receives response information sent by the server, where the response information indicates that the first program is successfully released on a service open platform on the server. For example, the server may be the task flow server 200 in the foregoing embodiments.

It can be learned from the foregoing that in the program orchestration method provided in this embodiment of this application, the resource for program orchestration is obtained from the wireless network, then is parsed and displayed on the touchscreen of the electronic device, and then program orchestration can be completed by using the gesture of the user. In this way, program orchestration efficiency of the electronic device is greatly improved, and user experience is also improved.

Figure 9:
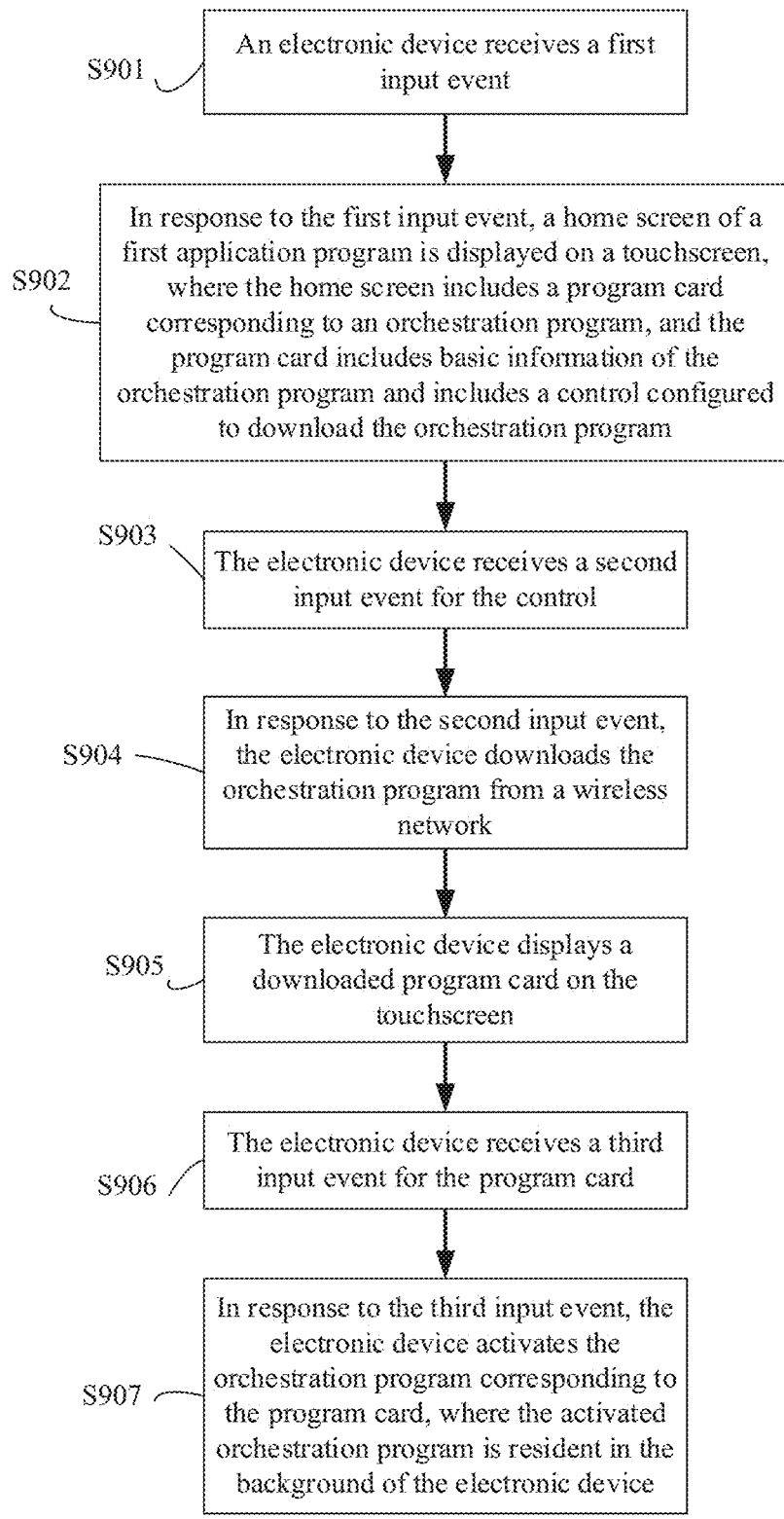
FIG. 9 is a schematic flowchart of a method according to some other embodiments.

As shown in FIG. 9, an embodiment of this application provides a method for activating an orchestrated program, where the method may be implemented on an electronic device having a touchscreen, and the method may specifically include the following steps.

Step S901: The electronic device receives a first input event (for example, a tap operation).

Step S902: In response to the first input event, a home screen of a first application program is displayed on the touchscreen, where the home screen includes a program card (for example, the task card in the foregoing embodiment) corresponding to the orchestrated program, and the program card includes basic information of the orchestrated program and includes a control configured to download the orchestrated program.

Step S903: The electronic device receives a second input event for the control.

Step S904: In response to the second input event, the electronic device downloads the orchestrated program from a wireless network, where the orchestrated program includes code for invoking a system service interface of the electronic device and code for invoking a network service interface in the wireless network, the orchestrated program is displayed on the touchscreen in a card form, and the basic information of the orchestrated program includes a name and a function brief introduction of the orchestrated program.

Step S905: The electronic device displays a downloaded program card on the touchscreen.

Step S906: The electronic device receives a third input event for the program card.

Step S907: In response to the third input event, the electronic device activates the orchestrated program corresponding to the program card, where the activated orchestrated program is resident in the background of the electronic device. An advantage of being resident in the background is that the electronic device may invoke the orchestrated program at any time. If a trigger event is detected, the electronic device may automatically run the orchestrated program more efficiently.

For example, the orchestrated program may be as follows: If the electronic device stores a new photo, the photo is automatically uploaded to WEIBO. After being activated, the orchestrated program is resident in a memory of the electronic device. If the electronic device detects that a new photo is stored, the orchestrated program is triggered, and the electronic device releases the new photo in a predetermined format to WEIBO based on the orchestrated program.

In another possible implementation, that the orchestrated program is automatically run in the background of the electronic device specifically includes: sending, by the orchestrated program by invoking the network service interface, data related to running to the wireless network.

In another possible implementation, the system service interface is an interface used for obtaining a new photo, and the network service interface is an interface used for obtaining a WEIBO service.

In the prior art, when a user wants to process a comparatively complex transaction on an electronic device, the user usually needs to switch back and forth among different apps to perform different processing. For example, if the user needs to book an air ticket and send air ticket information to a Facebook friend, the user needs to perform operations in an air ticket booking app to book the air ticket. After the air ticket is booked, the user opens a Facebook application program on the electronic device, finds one friend, opens a chat interface, and then switches to the air ticket booking app by using a multi-task management operation to view the air ticket information. Then, the user switches to the chat interface by using the multi-task management operation, enters the air ticket information in a text box, and finally sends the air ticket information to the friend. It can be learned from the foregoing that in the prior art, during processing daily transaction on the electronic device, switching back and forth among the plurality of apps is usually required. A technical solution of the prior art is very complex, and transaction processing efficiency of the electronic device is greatly reduced. However, in the technical solution shown in FIG. 9 and the foregoing embodiment, the activated orchestrated program, namely, a task flow, is specifically as follows: if storing the air ticket information, the electronic device automatically sends the air ticket information to a specific Facebook contact. In this case, once a trigger event (storing the air ticket information) occurs, the electronic device automatically sends the air ticket information to the specific Facebook contact. According to the foregoing solution, in the embodiments of this application, a capability of intelligent interaction between the electronic device and the user can be greatly improved, efficiency of using the electronic device can be improved, and user experience can also be improved.

In some embodiments of this application, the electronic device may receive an input of the user. The input may be a touch operation of the user on the touchscreen of the electronic device, or may be a press operation performed by the user on a physical button of the electronic device (for example, a touch-and-hold operation performed on a home screen key 204). The input may alternatively be a voice input. For example, a microphone 114 of the electronic device 100 collects a voice of the user, and converts the voice into a voice input after processing; and the electronic device 100 may identify the voice input, and may execute an instruction corresponding to the voice input. It can be understood that the foregoing input is not specifically limited in the embodiments of this application.

Figure 10:
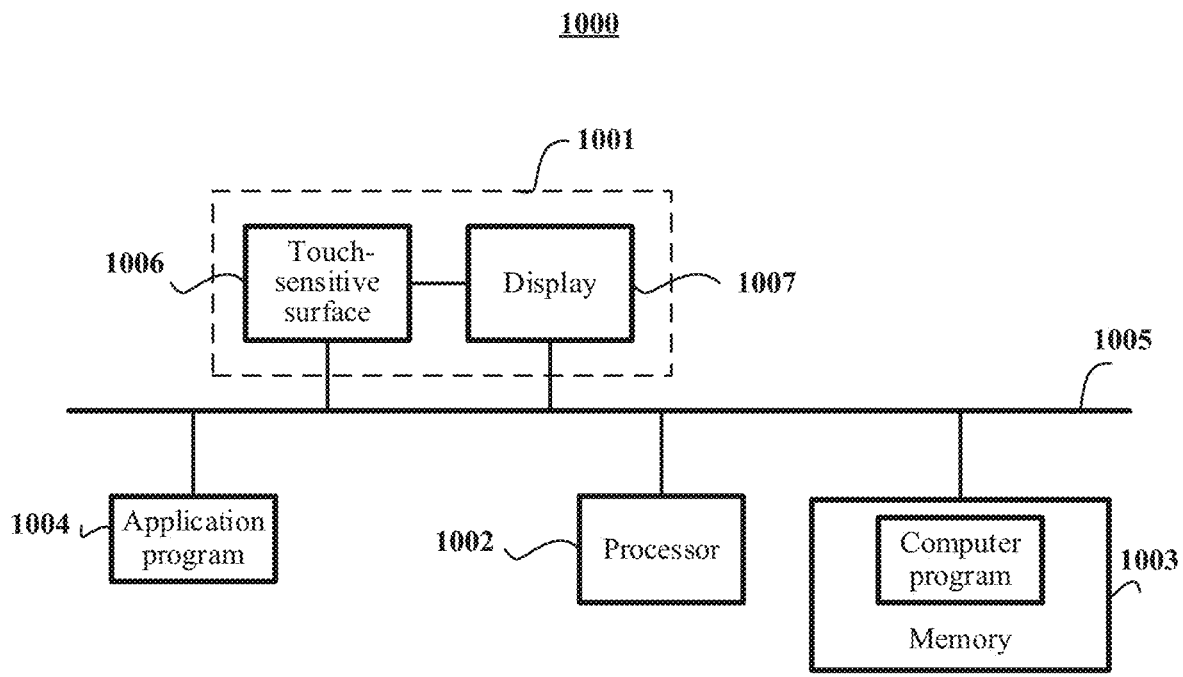
FIG. 10 is a schematic structural diagram of an electronic device according to some embodiments.

As shown in FIG. 10, an embodiment of this application further provides an electronic device 1000. The electronic device may include a touchscreen 1001, where the touchscreen 1001 includes a touch-sensitive surface 1006 (for example, a touch panel) and a display 1007, one or more processors 1002, a memory 1003, a plurality of application programs 1004, and one or more computer programs 1005, where the one or more computer programs are stored in the memory, the one or more computer programs 1005 include an instruction, and when the instruction is executed by the electronic device, the electronic device is enabled to perform the method in the corresponding embodiment of FIG. 8. Details are not described herein.

Figure 11:
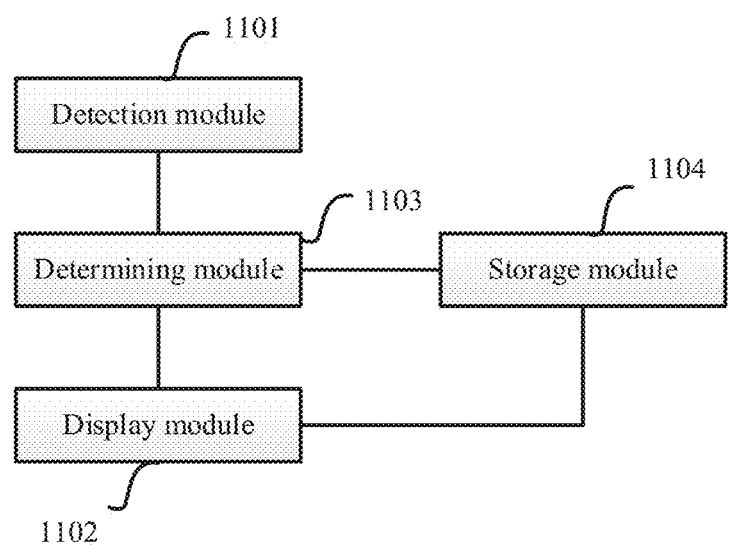
FIG. 11 is a schematic structural diagram of a program orchestration apparatus according to some other embodiments.

As shown in FIG. 11, an embodiment of this application further provides a program orchestration apparatus. The apparatus may include a detection module 1101, a display module 1102, a processing module 1103, and a storage module 1104. The display module 1102 is connected to the processing module 1103 and the storage module 1104, and is configured to display various graphical user interfaces. The detection module 1101 is connected to the processing module 1102, and is configured to detect an input event (for example, a touch gesture) of a user on the foregoing apparatus. The processing module 1103 is configured to receive a touch event detected by the detection module 1101, and execute a specific instruction in response to the touch event. The storage module 1104 is configured to store various data, including the graphical user interfaces displayed by the display module 1102.

The display module 1102 may be a display, the detection module 1101 may be a touch panel, the storage module 1104 may be a non-volatile memory, and the processing module 1103 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof.

The apparatus shown in FIG. 11 may perform the technical solutions shown in the foregoing embodiments and the drawings. Details are not described herein.

It should be noted that, in the embodiments of this application, division into the units is exemplary, and is merely a logical function division. In actual implementation, another division manner may be used. Functional units in the embodiments of the present invention may be integrated into one processing unit, or each of the units may exist alone physically, or two or more units are integrated into one unit. For example, in the foregoing embodiment, a first obtaining unit and a second obtaining unit may be a same unit or may be different units. The integrated unit may be implemented in a form of hardware, or may be implemented in a form of a software functional unit.

According to the context, the term "when" used in the foregoing embodiments may be interpreted as a meaning of "if" or "after" or "in response to determining" or "in response to detecting". Similarly, according to the context, the phrase "when it is determined that" or "if (a stated condition or event) is detected" may be interpreted as a meaning of "when it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing descriptions are provided with reference to specific embodiments. However, the foregoing example discussion is not intended to be detailed, and is not intended to limit this application to a disclosed precise form. According to the foregoing teaching content, many modification forms and variation forms are possible. Embodiments are selected and described to fully illustrate the principles of this application and practical application of the principles, so that other persons skilled in the art can fully use this application and various embodiments that have various modifications applicable to conceived specific usage.

What is claimed is:

1. A program orchestration method implemented by an electronic device comprising a touchscreen, wherein the program orchestration method comprises:

displaying, on the touchscreen, atomic service icons corresponding to atomic services, wherein each of the atomic service icons corresponds to a respective one of the atomic services, wherein the atomic services comprise a trigger-type atomic service and an action-type atomic service, wherein a program can be generated by orchestrating the trigger-type atomic service and the action-type atomic service, and wherein each of the atomic services provides a respective service capability in a corresponding application programming interface (API) manner;

displaying an orchestration area on the touchscreen;

detecting a first touch event from a user for on a first atomic service icon, wherein the first atomic service icon corresponds to the trigger-type atomic service, and wherein the trigger-type atomic service is a system service of the electronic device;

displaying the first atomic service icon in the orchestration area in response to the first touch event;
detecting a second touch event from the user on a second atomic service icon of the atomic service icons, wherein the second atomic service icon corresponds to the action-type atomic service, and wherein the action-type atomic service is a network service;
displaying the second atomic service icon in the orchestration area in response to the second touch event;
detecting a third touch event from the user;
orchestrating the first atomic service icon and the second atomic service icon to generate a first program in response to the third touch event;
detecting an input from the user;
sending release request information to a server in a wireless network in response to detecting the input, wherein the release request information comprises an identifier of the first program and an identifier of the electronic device; and
receiving response information from the server, wherein the response information indicates that the first program is successfully released on a service open platform so that the first program can be downloaded by another electronic device.

2. The program orchestration method of claim 1, wherein the first program comprises code to invoke a system service interface of the electronic device and code to invoke a network service interface in a wireless network.

3. The program orchestration method of claim 2, further comprising:
obtaining, by the network service interface, a new photo; and
invoking, by the network service interface, a microblog service.

4. The program orchestration method of claim 1, wherein the trigger-type atomic service provides a first service capability using a local API of the electronic device, and wherein the action-type atomic service provides a second service capability using an API of a network.

5. The program orchestration method of claim 1, wherein the first touch event is a first gesture of dragging the first atomic service icon, and wherein the second touch event is a second gesture of dragging the second atomic service icon.

6. The program orchestration method of claim 1, further comprising:
orchestrating the trigger-type atomic service and the action-type atomic service based on a program orchestration model in response to the third touch event; and
generating the first program in response to the third touch event.

7. An electronic device, comprising:
a touchscreen;
a processor coupled to the touchscreen; and
a memory coupled to the processor and storing instructions that, when executed by the processor, cause the electronic device to be configured to:
display, on the touchscreen, atomic service icons corresponding to atomic services, wherein each of the atomic service icons corresponds to a respective one of the atomic services, wherein the atomic services comprise a trigger-type atomic service and an action-type atomic service, wherein a program can be generated by orchestrating the trigger-type atomic service and the action-type atomic service, and wherein each of the atomic services provides a respective service capability in a corresponding application programming interface (API) manner;
display an orchestration area on the touchscreen;
detect a first touch event from a user for on a first atomic service icon of the atomic service icons, wherein the first atomic service icon corresponds to the trigger-type atomic service, and wherein the trigger-type atomic service is a system service of the electronic device;
display the first atomic service icon in the orchestration area in response to the first touch event;
detect a second touch event from the user on a second atomic service icon of the atomic service icons, wherein the second atomic service icon corresponds to the action-type atomic service, and wherein the action-type atomic service is a network service;
display the second atomic service icon in the orchestration area in response to the second touch event;
detect a third touch event from the user;
orchestrate the first atomic service icon and the second atomic service icon to generate a first program in response to the third touch event;
detect an input from the user;
send release request information to a server in a wireless network in response to detecting the input, wherein the release request information comprises an identifier of the first program and an identifier of the electronic device; and
receive response information from the server, wherein the response information indicates that the first program is successfully released on a service open platform so that the first program can be downloaded by another electronic device.

8. The electronic device of claim 7, wherein the first program comprises code of the trigger-type atomic service and code of the action-type atomic service.

9. The electronic device of claim 7, wherein the trigger-type atomic service provides a first service capability using a local API of the electronic device, and wherein the action-type atomic service provides a second service capability using an API of a network.

10. The electronic device of claim 7, wherein the first touch event is a first gesture of dragging the first atomic service icon, and wherein the second touch event is a second gesture of dragging the second atomic service icon.

11. The electronic device of claim 7, wherein the instructions further cause the electronic device to be configured to:
orchestrate the trigger-type atomic service and the action-type atomic service based on a program orchestration model in response to the third touch event; and
generate the first program in response to the third touch event.

12. The electronic device of claim 7, wherein the first program includes code to invoke a system service interface of the electronic device and code to invoke a network service interface in a wireless network, wherein the system service interface is configured to obtain a new photo, and wherein the network service interface is configured to invoke a WEIBO microblog service.

13. A computer program product comprising computer-executable instructions for storage on a non-transitory computer-readable medium that, when executed by a processor, cause an electronic device to:
display, on a touchscreen of the electronic device, atomic service icons corresponding to atomic services, wherein each of the atomic service icons corresponds to a respective one of the atomic services, wherein the atomic services comprises a trigger-type atomic service and an action-type atomic service, wherein a program can be generated by orchestrating the trigger-type atomic service and the action-type atomic service, and wherein each of the atomic services provides a respective service capability in a corresponding application programming interface (API) manner;

display an orchestration area on the touchscreen;

detect a first touch event from a user on a first atomic service icon of the atomic service icons, wherein the first atomic service icon corresponds to the trigger-type atomic service, and wherein the trigger-type atomic service is a system service of the electronic device;

display the first atomic service icon in the orchestration area in response to the first touch event;

detect a second touch event from the user for a second atomic service icon of the atomic service icons, wherein the second atomic service icon corresponds to the action-type atomic service of the atomic services, and wherein the action-type atomic service is a network service;

display the second atomic service icon in the orchestration area in response to the second touch event;

detect a third touch event from the user;

orchestrate the first atomic service icon and the second atomic service icon to generate a first program in response to the third touch event, detect an input from the user;

send release request information to a server in a wireless network in response to detecting the input, wherein the release request information comprises an identifier of the first program and an identifier of the electronic device; and receive response information from the server, wherein the response information indicates that the first program is successfully released on a service open platform so that the first program can be downloaded by another electronic device.

14. The computer program product of claim 13, wherein the first program comprises code to invoke a system service interface of the electronic device and code to invoke a network service interface in a wireless network.

15. The computer program product of claim 13, wherein the trigger-type atomic service provides a first service capability using a local API of the electronic device, and wherein the action-type atomic service provides a second service capability using an API of a network.

16. The computer program product of claim 13, wherein the first touch event is a first gesture of dragging the first atomic service icon, and wherein the second touch event is a second gesture of dragging the second atomic service icon.

17. The computer program product of claim 13, wherein the computer-executable instructions further cause the electronic device to:

orchestrate the trigger-type atomic service and the action-type atomic service based on a program orchestration model in response to the third touch event; and generate the first program in response to the third touch event.

* * * * *

UNITED STATES PATENT AND TRADEMARK OFFICE
CERTIFICATE OF CORRECTION

PATENT NO. : 11,204,681 B2
APPLICATION NO. : 16/958976
DATED : December 21, 2021
INVENTOR(S) : Xiong et al.

Page 1 of 1

It is certified that error appears in the above-identified patent and that said Letters Patent is hereby corrected as shown below:

In the Claims

Claim 12, Column 36, Line 57: "WEIBO microblog" should read "microblog"

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*